US012485665B2

(12) United States Patent
Kim et al.

(10) Patent No.: US 12,485,665 B2
(45) Date of Patent: Dec. 2, 2025

(54) PRINTING APPARATUS AND METHOD OF MANUFACTURING WINDOW MEMBER USING THE PRINTING APPARATUS

(71) Applicant: SAMSUNG DISPLAY CO., LTD., Yongin-si (KR)

(72) Inventors: Jun Young Kim, Yongin-si (KR); Dong Ho Kim, Yongin-si (KR); Ju Suk Oh, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/491,573

(22) Filed: Oct. 20, 2023

(65) Prior Publication Data

US 2024/0300232 A1 Sep. 12, 2024

(30) Foreign Application Priority Data

Mar. 8, 2023 (KR) ........................ 10-2023-0030622

(51) Int. Cl.

| | |
|---|---|
| ***B41F 17/24*** | (2006.01) |
| ***B41F 1/38*** | (2006.01) |
| ***B41F 17/00*** | (2006.01) |
| ***B41M 1/10*** | (2006.01) |
| ***B41M 1/40*** | (2006.01) |

(52) U.S. Cl.

CPC .............. *B41F 1/38* (2013.01); *B41F 17/001* (2013.01); *B41F 17/24* (2013.01); *B41M 1/10* (2013.01)

(58) Field of Classification Search

None

See application file for complete search history.

(56) References Cited

U.S. PATENT DOCUMENTS

| | | | | |
|---|---|---|---|---|
| 6,820,553 B2 * | 11/2004 | Steffen | .................... | B41F 15/26 269/280 |
| 2020/0262194 A1 * | 8/2020 | Shim | .................. | H04M 1/0266 |

FOREIGN PATENT DOCUMENTS

| | | |
|---|---|---|
| CN | 211251737 U * | 8/2020 |
| KR | 10-1189752 | 10/2012 |
| KR | 20130008320 A * | 1/2013 |
| KR | 10-1818971 | 1/2018 |
| KR | 10-2211081 | 2/2021 |

OTHER PUBLICATIONS

English language translation of CN 211251737 U to Chen, publication date Aug. 14, 2020. (Year: 2020).*

English language translation of KR 10-2013-0008320 to Choi, publication date Jan. 22, 2013. (Year: 2013).*

* cited by examiner

*Primary Examiner* — Leslie J Evanisko

(74) *Attorney, Agent, or Firm* — F. CHAU & ASSOCIATES, LLC

(57) ABSTRACT

A printing apparatus includes, an outer jig comprising an outer wall portion and a recessed portion, an inner jig disposed in the recessed portion and forming a hole between the outer wall portion and the inner jig, and a print head comprising a pad portion configured to overlap the hole, wherein the outer jig comprises an outer coupling portion disposed adjacent to a first surface of the outer jig facing the inner jig, the inner jig comprises an inner coupling portion disposed adjacent to a second surface of the inner jig facing the outer jig, and the outer jig and the inner jig are detachable from each other by detachment of the outer coupling portion and the inner coupling portion from each other.

16 Claims, 24 Drawing Sheets

PRINTING APPARATUS AND METHOD OF MANUFACTURING WINDOW MEMBER USING THE PRINTING APPARATUS

This application claims priority under 35 U.S.C. § 119 to Korean Patent Application No. 10-2023-0030622, filed on Mar. 8, 2023, in the Korean Intellectual Property Office, the disclosure of which is incorporated by reference herein in its entirety.

BACKGROUND

1. Technical Field

The present disclosure relates to a printing apparatus and a method of manufacturing a window member using the printing apparatus.

2. Discussion of Related Art

Display devices are becoming increasingly important with the proliferation of digitized information, media consumption, and virtual collaboration. The display devices may include, for example, liquid crystal displays (LCDs) and organic light emitting displays (OLEDs).

Display devices having bent edge portions have been introduced. These display devices may have improved aesthetics and may enable new interactions.

Various wirings or elements may be disposed in a non-display area of a display device. A light blocking portion may be disposed to prevent these elements from being visible from the outside.

SUMMARY

Aspects of the present disclosure may provide a printing apparatus with increased process efficiency and improved printing accuracy and a method of manufacturing a window member.

Aspects of the present disclosure may also provide a display device with improved adhesion between a window member and a case member.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a printing apparatus comprising, an outer jig comprising an outer wall portion and a recessed portion, an inner jig disposed in the recessed portion and forming a hole between the outer wall portion and the inner jig, and a print head comprising a pad portion configured to overlap the hole, wherein the outer jig comprises an outer coupling portion disposed adjacent to a first surface of the outer jig facing the inner jig, the inner jig comprises an inner coupling portion disposed adjacent to a second surface of the inner jig facing the outer jig, and the outer jig and the inner jig are detachable from each other by detachment of the outer coupling portion and the inner coupling portion from each other.

In an embodiment, a size of the recessed portion may be larger than a size of the inner jig in plan view.

In an embodiment, the outer coupling portion and the inner coupling portion may respectively comprise magnets having different polarities.

In an embodiment, at least one of the outer coupling portion or the inner coupling portion may include a magnet.

In an embodiment, a magnet may comprise a ferromagnetic material.

In an embodiment, the outer coupling portion may be located inside the outer jig and exposed on the first surface, the inner coupling portion may be located inside the inner jig and exposed on the second surface, and the outer coupling portion and the inner coupling portion directly contact each other in a state where the outer jig and the inner jig are coupled to each other.

In an embodiment, the outer coupling portion may be located inside the outer jig, the inner coupling portion may be located inside the inner jig, and the outer coupling portion and the inner coupling portion may be spaced apart from each other in a state where the outer jig and the inner jig are coupled to each other.

In an embodiment, the outer coupling portion may be recessed in the first surface and the inner coupling portion may protrude from the second surface and the inner coupling portion may fit within the outer coupling portion in a state where the outer jig and the inner jig are coupled to each other.

In an embodiment, the outer coupling portion may protrude from the first surface and the inner coupling portion may be recessed in the second surface, and the outer coupling portion may fit within the inner coupling portion in a state where the outer jig and the inner jig are coupled to each other.

In an embodiment, the pad portion may be inserted into the hole to print ink on a surface of an object disposed on the inner jig.

In an embodiment, the pad portion has a same shape as the hole in plan view.

In an embodiment, the inner jig may comprise a support portion comprising a flat surface, and a plurality of side portions and a plurality of corner portions, surrounding the support portion and disposed adjacent to the support portion, and wherein upper surfaces of the plurality of side portions and the plurality of corner portions are curved surfaces.

In an embodiment, the pad portion may have a same shape as a shape formed by the plurality of side portions and the plurality of corner portions in plan view.

In an embodiment, the print head may comprise a head body, wherein the pad portion may be disposed on the print head, and the pad portion may comprise an opening exposing the head body.

According to another aspect of the present disclosure, there is provided a method of manufacturing a window member using a printing apparatus, the method comprising, coupling an inner jig to an outer jig forming a hole between the outer jig and the inner jig, placing the window member on the inner jig, aligning a pad portion with the hole, wherein an ink is applied to the pad portion, and printing the ink on the window member by moving the pad portion.

In an embodiment, the ink may comprise a light blocking material and a method may comprise hardening the ink on the window member to form a light blocking portion.

In an embodiment, a method may comprise preparing the window member and the inner jig compatible with the window member, wherein the inner jig may comprise a support portion comprising a flat surface, and a plurality of side portions and a plurality of corner portions surrounding the support portion and disposed adjacent to the support portion, the window member comprises a flat portion, a bending portion surrounding the flat portion and located on a side of the flat portion, and an outer side surface surrounding the bending portion and located on a side of the bending portion, and in the placing of the window member on the inner jig, an outer periphery of the flat portion of the window member may be disposed inside an outer periphery of the support portion of the inner jig.

In an embodiment, an area of the flat portion of the window member may be smaller than an area of the support portion of the inner jig.

In an embodiment, in the aligning of the pad portion with the hole, the pad portion may overlap at least a portion of the flat portion of the window member.

According to another aspect of the present disclosure, there is provided a printing apparatus comprising, an outer jig comprising a recessed portion and an outer coupling portion disposed adjacent to a first surface of the outer jig, an inner jig detachably coupled to the outer jig and comprising an inner coupling portion disposed adjacent to a second surface of the inner jig facing the outer jig and having a curved shape at side portions thereof, and a print head comprising a pad portion, the pad portion comprising a portion overlapping the side portions of the inner jig.

According to an embodiment of the present disclosure a printing apparatus and a method of manufacturing a window member may operate to increase a process efficiency, and improve printing accuracy.

In a display device according to an embodiment of the present disclosure, adhesion between a window member and a case member can be improved.

However, the effects of the present disclosure are not restricted to those set forth herein. The above and other effects of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description, taken in conjunction with the accompanying drawings in which.

DETAILED DESCRIPTION

The invention will now be described more fully hereinafter with reference to the accompanying drawings, in which preferred embodiments of the invention are shown. This invention may, however, be embodied in different forms and should not be construed as limited to embodiments set forth herein. Rather, embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may be present. The same reference numbers indicate the same components throughout the specification and redundant descriptions thereof may be omitted or given briefly.

Hereinafter, embodiments will be described in detail with reference to the accompanying drawings.

Figure 1:
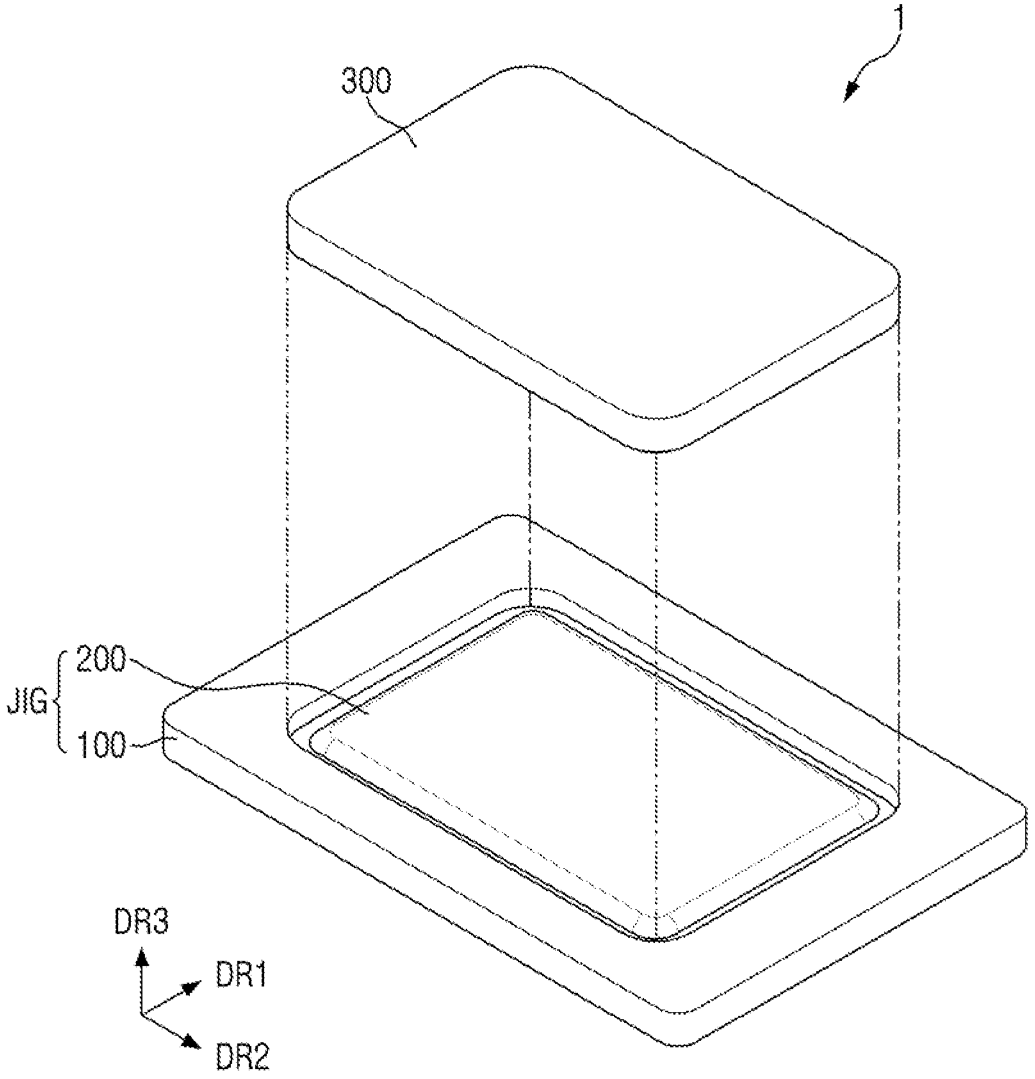
FIG. 1 is a perspective view of a printing apparatus according to an embodiment.
Figure 2:
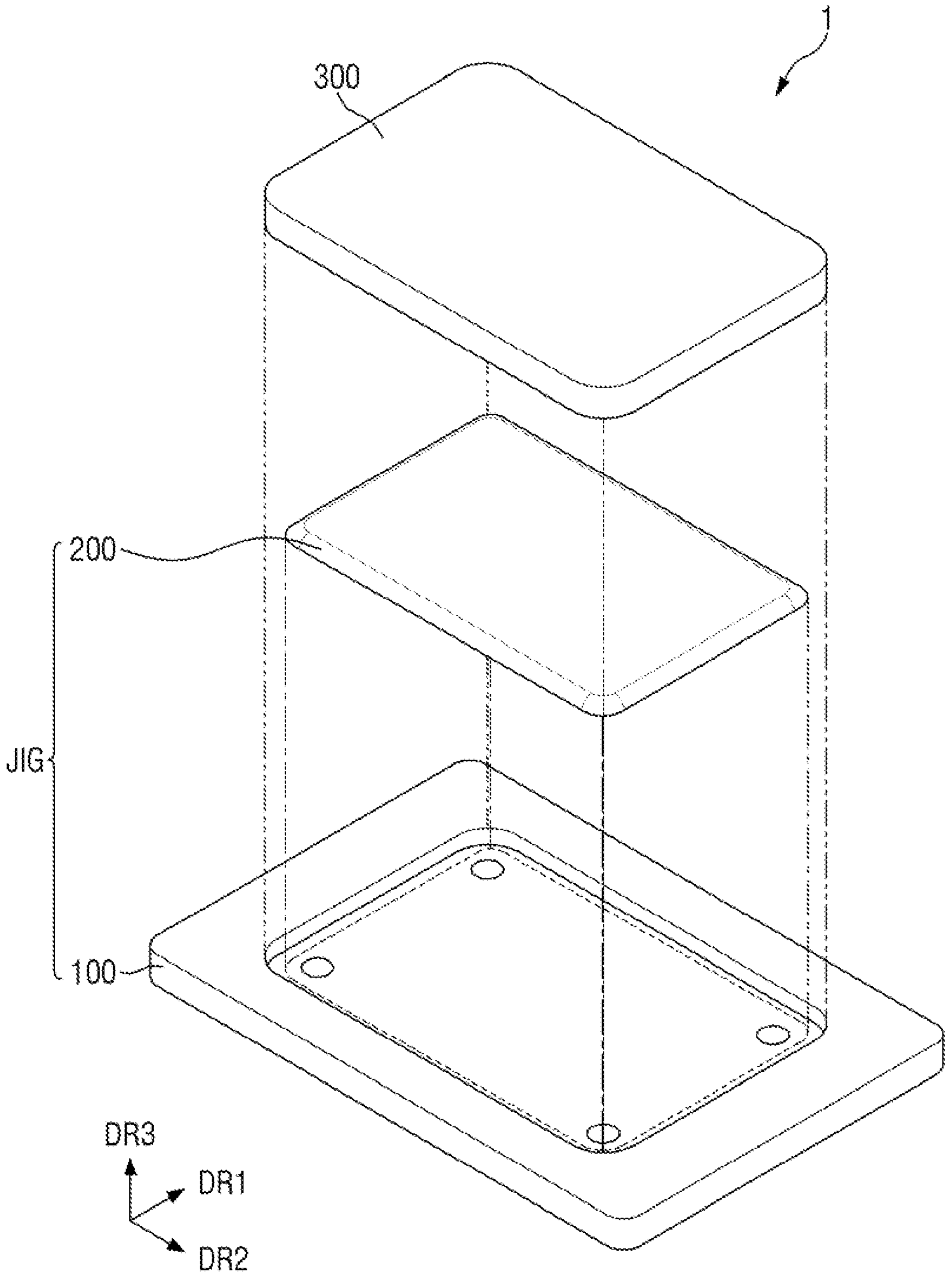
FIG. 2 is an exploded perspective view of the printing apparatus of FIG. 1.
Figure 3:
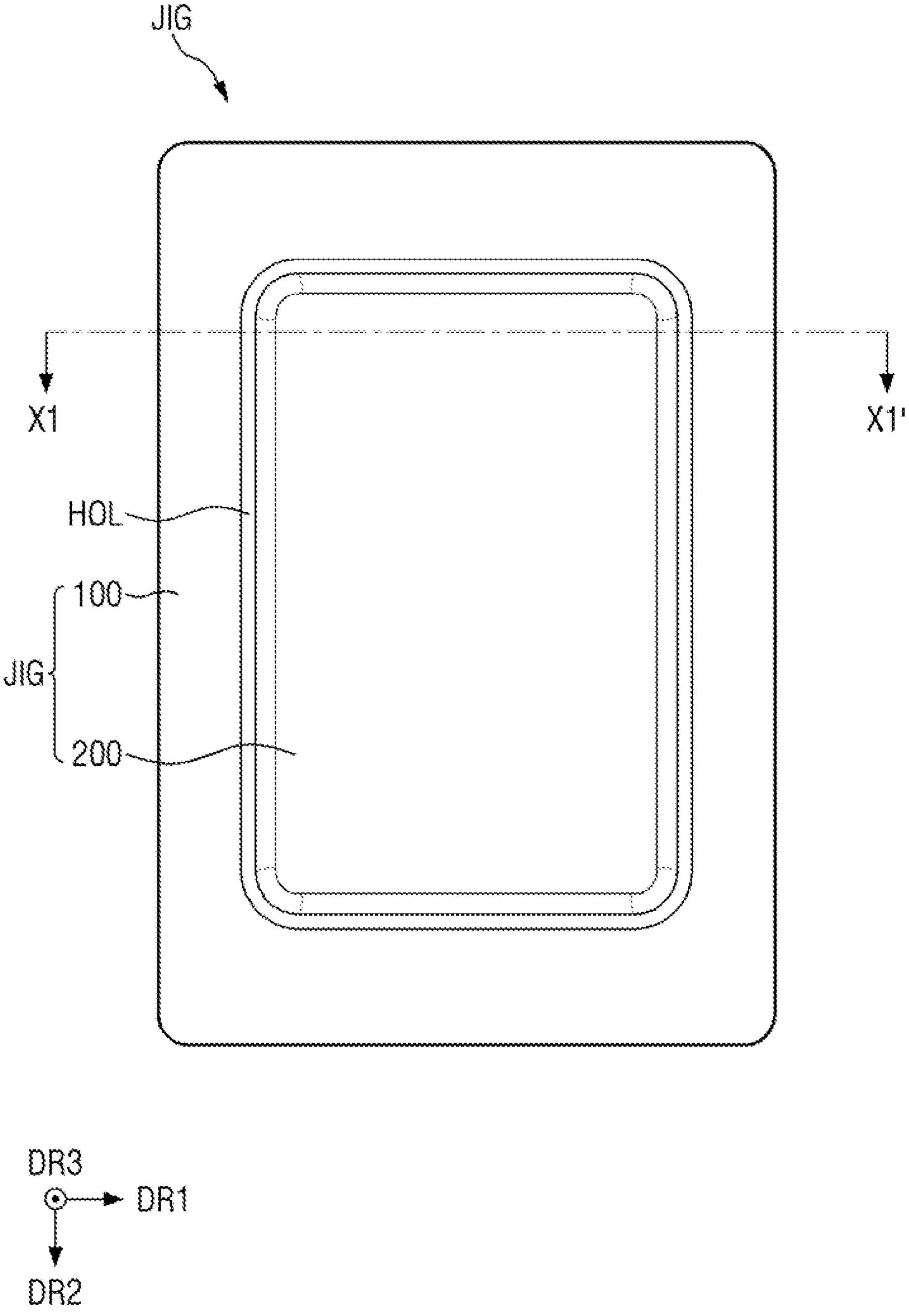
FIG. 3 is a plan view illustrating an assembled state of a jig according to an embodiment.

FIG. 1 is a perspective view of a printing apparatus 1 according to an embodiment. FIG. 2 is an exploded perspective view of the printing apparatus 1 of FIG. 1. FIG. 3 is a plan view illustrating an assembled state of a jig JIG according to an embodiment.

Referring to FIGS. 1 through 3, the printing apparatus 1 according to an embodiment may be an apparatus for printing ink on a window member. For example, the printing apparatus 1 may be an apparatus for printing ink I (see FIG. 20) on a periphery of a window member WM (see FIG. 18) to form a light blocking portion BM (see FIG. 23) in a display device DD (see FIG. 22).

The printing apparatus 1 may include a jig JIG and a print head 300. The print head 300 may be disposed on the jig JIG.

The jig JIG may allow an object such as the window member WM (see FIG. 18) to be mounted and supported thereon. The jig JIG may include an outer jig 100 and an inner jig 200.

As illustrated in FIG. 2, the outer jig 100 and the inner jig 200 may be freely separated from each other and coupled to each other. That is, the outer jig 100 and the inner jig 200 are detachable from one another. In the printing apparatus 1 according to an embodiment, the inner jig 200 may be detachable from the outer jig 100, and the inner jig 200 may be freely replaced according to the size and shape of an object. Accordingly, a process cost for manufacturing the jig JIG may be reduced compared with a process cost for manufacturing an integrated jig JIG. In addition, in a case that the object is changed, the inner jig 200 and a pad portion 320 (see FIG. 9) of the print head 300 may be replaced, and an alignment between the outer jig 100 and the print head 300 can be maintained. Therefore, the accuracy of the printing process may be improved, and the process time may be reduced.

In some embodiments, the jig JIG may have a shape corresponding to a shape of an object. For example, in a case that the window member WM (see FIG. 18) has a substantially rectangular shape in plan view, the jig JIG may have a substantially rectangular shape in plan view. In this case, the jig JIG may include two first sides extending in a first direction DR1 and two second sides extending in a second direction DR2. The jig JIG may be shaped like a rectangular parallelepiped with rounded corners as illustrated in the drawings, but the present disclosure is not limited thereto. The size of the jig JIG may be larger than the size of the object.

In the drawings, the first direction DR1 and the second direction DR2 are horizontal directions intersecting each other. For example, the first direction DR1 and the second direction DR2 may be orthogonal to each other. In addition, a third direction DR3 may be a vertical direction intersecting, e.g., orthogonal to, the first direction DR1 and the second direction DR2. Unless otherwise defined, a direction indicated by an arrow of each of the first direction DR1, the second direction DR2, and the third directions DR3 may be referred to as a first side, and the opposite direction may be referred to as a second side. In addition, the terms "on," "above," "upper," "top," and "upper surface" used herein denote a direction in which the arrow of the third direction DR3 points in the drawings, and the terms "under," "below," "lower," "bottom," and "lower surface" used herein denote a direction opposite to the direction in which the arrow of the third direction DR3 points in the drawings.

As illustrated in FIG. 3, the inner jig 200 may be surrounded by an outer wall portion 110 (see FIG. 4) of the outer jig 100. The jig JIG may include a hole HOL disposed between the outer jig 100 and the inner jig 200 in a state where the outer jig 100 and the inner jig 200 are coupled to each other. The hole HOL may be a space into which the pad portion 320 (see FIG. 9) of the print head 300 can be inserted. The hole HOL may be disposed along a portion of an interface between the outer jig 100 and the inner jig 200, for example, along the two second sides extending in the second direction DR2, or around an entirety of the interface between the outer jig 100 and the inner jig 200.

In some embodiments, the hole HOL may include two sides extending along the first direction DR1 and facing each other in the second direction DR2 and two sides extending along the second direction DR2 and facing each other in the first direction DR1 in plan view. In addition, the hole HOL may include four vertices located between the sides and having a round curved shape in plan view.

The print head 300 may be disposed on the jig JIG. The print head 300 may be disposed to face the jig JIG along the third direction DR3. For example, the print head 300 may be located above the jig JIG as illustrated in FIGS. 1 and 2. The print head 300 may have a shape corresponding to the shape of an object. The size of the print head 300 may be larger than the size of the object, and may be smaller than the size of the jig JIG. The size of the print head 300 may be larger than the size of the inner jig 200.

Figure 4:
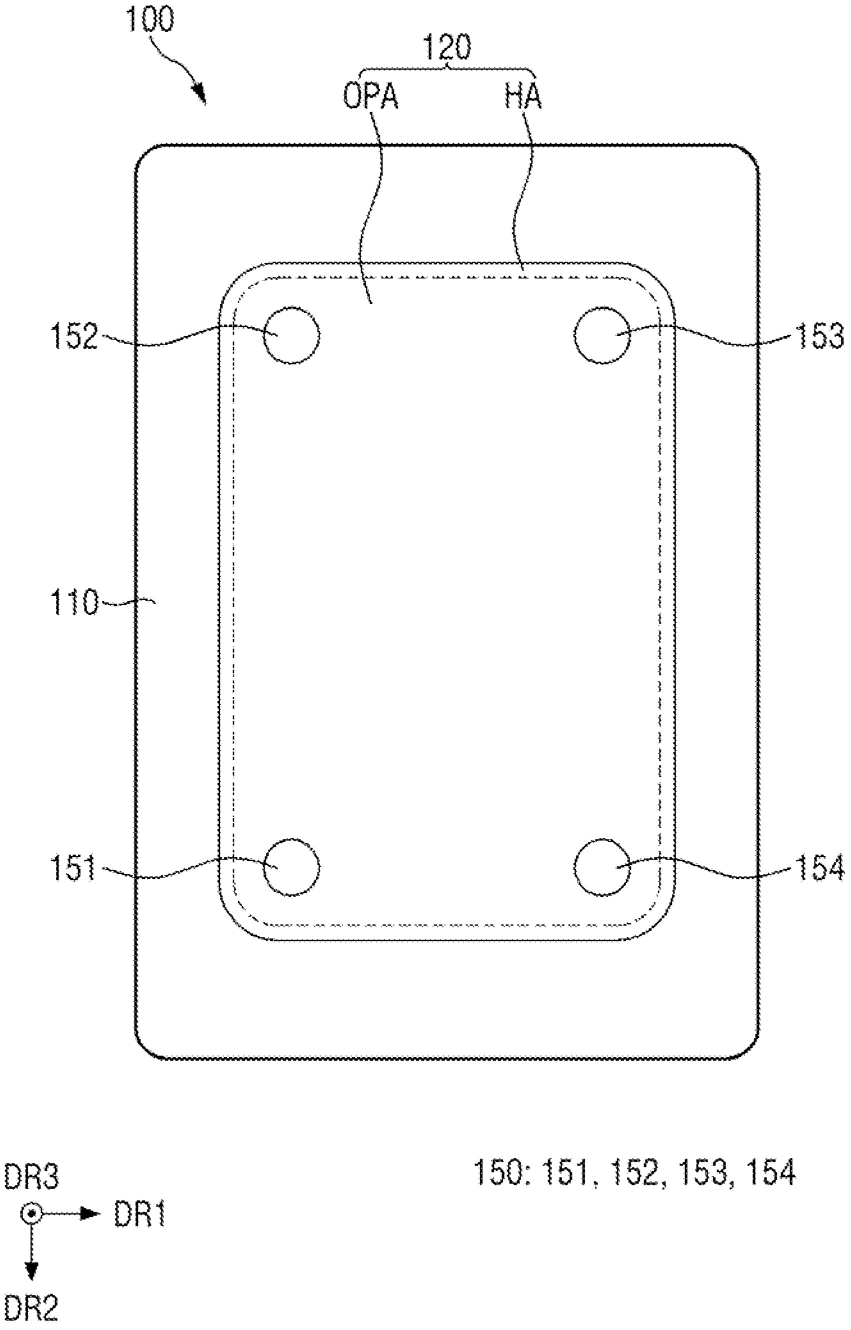
FIG. 4 is a plan view of an outer jig in a disassembled state of the jig of FIG. 3.
Figure 5:
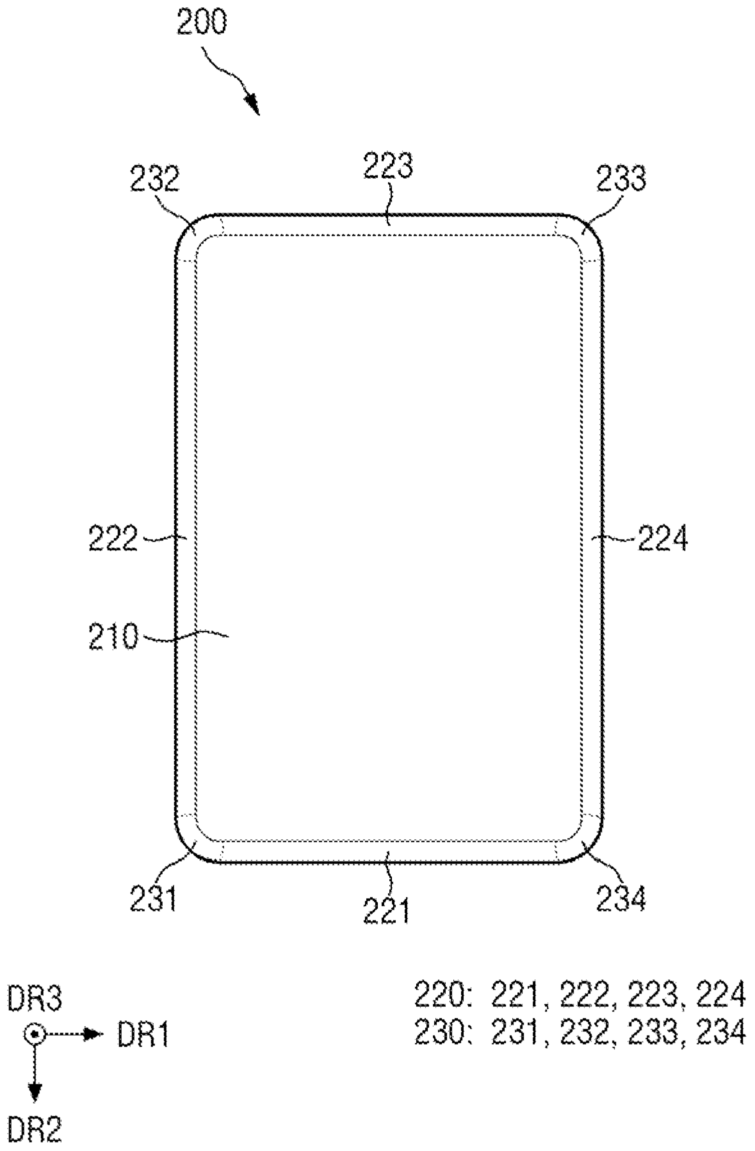
FIG. 5 is a plan view of an inner jig in the disassembled state of the jig of FIG. 3.
Figure 8:
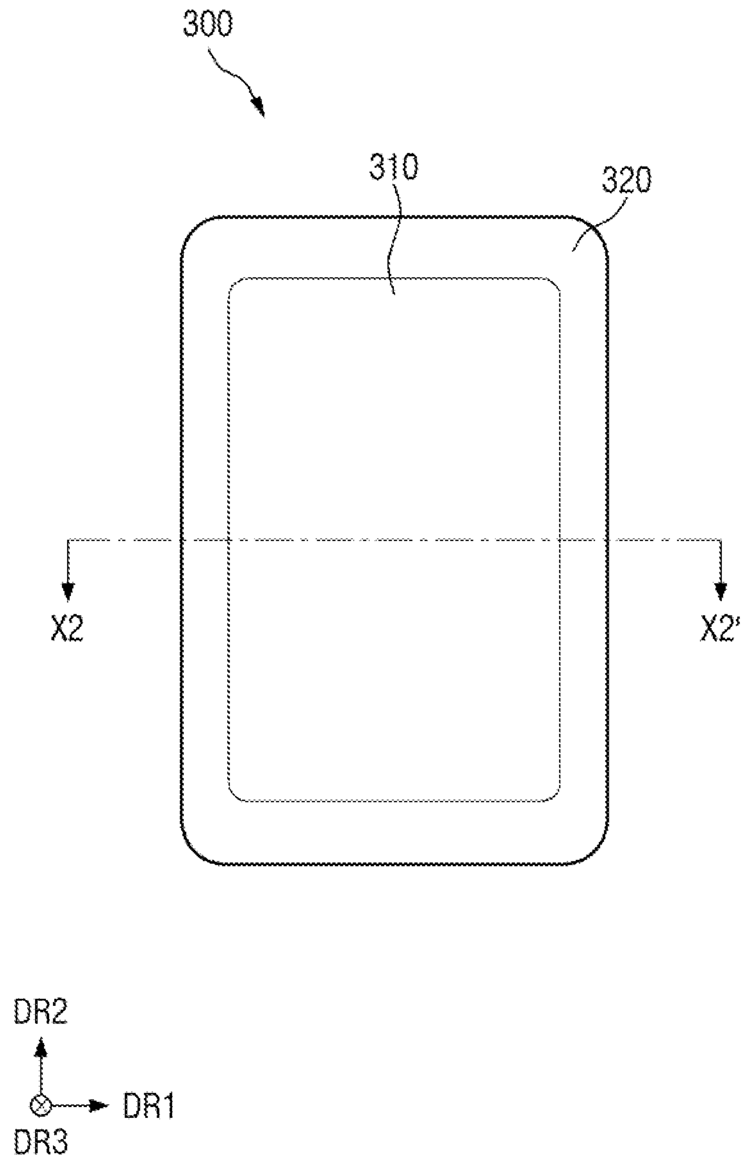
FIG. 8 is a bottom view of a print head according to an embodiment.

The outer jig 100 and the inner jig 200 is described herein with reference to FIGS. 4 and 5, respectively, and the print head 300 is described herein with reference to FIG. 8 and other drawings.

FIG. 4 is a plan view of the outer jig 100 in a disassembled state of the jig JIG of FIG. 3.

Referring to FIG. 4, in addition to FIG. 3, the outer jig 100 may include the outer wall portion 110, a recessed portion 120, and outer coupling portions 150.

The outer wall portion 110 may surround the recessed portion 120. The shape of outer walls of the outer wall portion 110 may correspond to the shape of the outer jig 100. The shape of inner walls of the outer wall portion 110 may correspond to the shape of the inner jig 200. For example, the outer walls and the inner walls of the outer wall portion 110 may have a rectangular shape with rounded corners in plan view as illustrated in the drawings.

The recessed portion 120 may be a space recessed toward the second side of the outer jig 100 in the third direction DR3, that is, in a downward direction of the outer jig 100. For example, an upper surface of the recessed portion 120 may be located lower than an upper surface of the outer wall portion 110 in the outer jig 100. The recessed portion 120 may serve as an internal space in which the inner jig 200 can be located. The shape of the recessed portion 120 may be the same as the combined shape of the inner walls of the outer wall portion 110.

The size of the recessed portion 120 may be larger than the size of the inner jig 200. Accordingly, the jig JIG may include the hole HOL disposed between the outer jig 100 and the inner jig 200 in a state where the outer jig 100 and the inner jig 200 are coupled to each other. For example, the recessed portion 120 may include an overlap area OPA overlapping the inner jig 200 and a hole area HA not overlapping the inner jig 200. An outline of the inner jig 200 is illustrated in FIG. 4 as a broken line.

Figure 6:
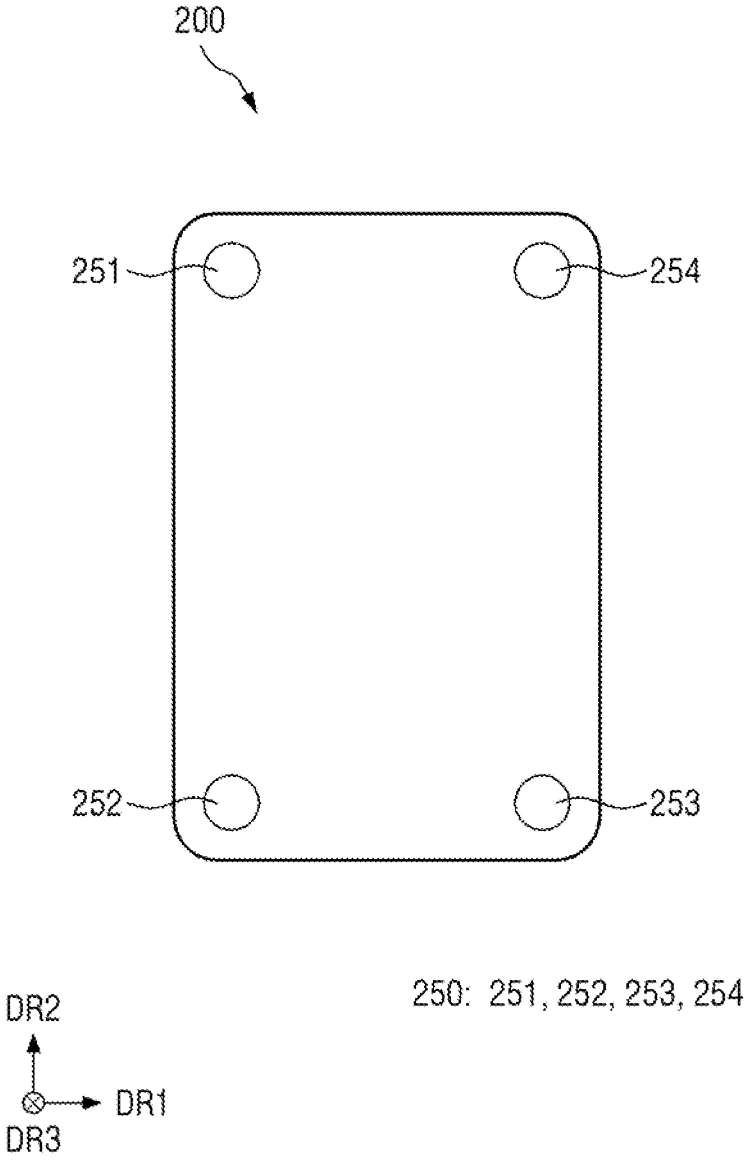
FIG. 6 is a bottom view of the inner jig in the disassembled state of the jig of FIG. 3.
Figure 7:
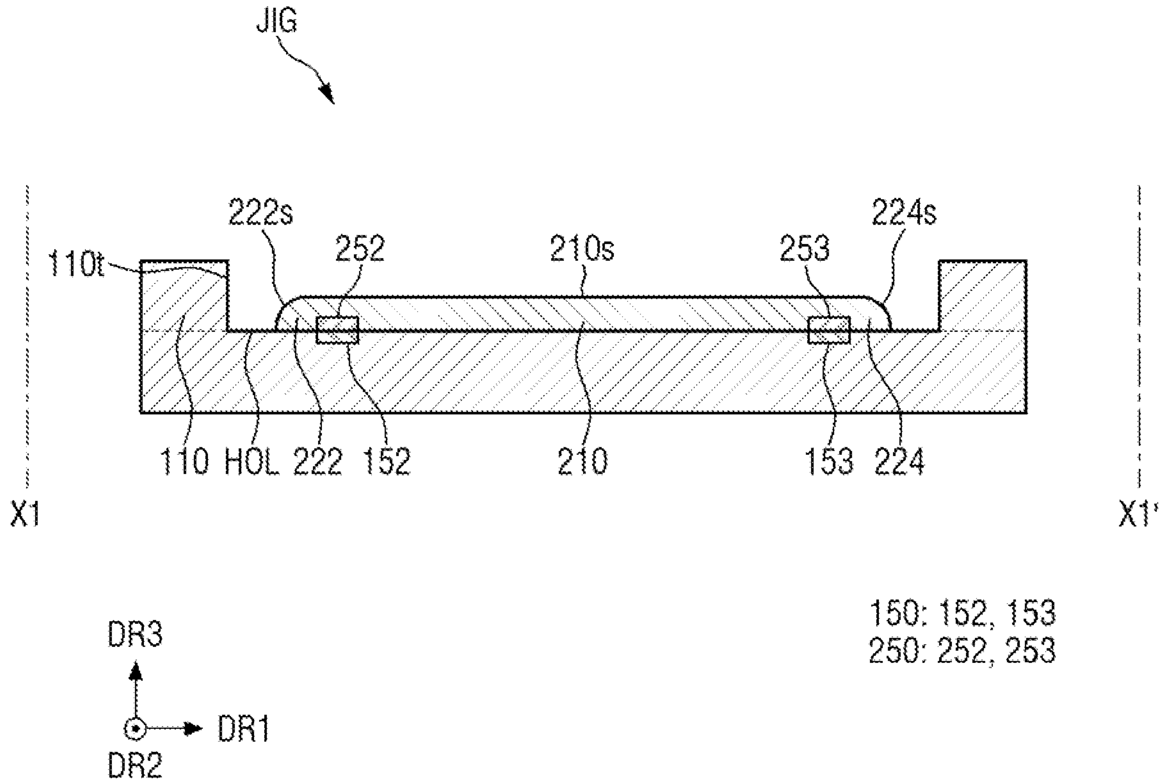
FIG. 7 is a cross-sectional view of the jig, taken along line X1-X1' of FIG. 3.

The outer coupling portions 150 may be disposed in the overlap area OPA (see FIG. 7). The outer coupling portions 150 may overlap inner coupling portions 250 in the third direction DR3. The outer coupling portions 150 may couple the outer jig 100 and the inner jig 200 to each other, together with the inner coupling portions 250 (see FIG. 6) included in the inner jig 200.

In an embodiment, as illustrated in the drawings, the outer coupling portions 150 may include a first outer coupling portion 151, a second outer coupling portion 152, a third outer coupling portion 153, and a fourth outer coupling portion 154. The first outer coupling portion 151 may be located adjacent to a corner located on the second side in the first direction DR1 and the first side in the second direction DR2. The second outer coupling portion 152 may be located adjacent to a corner located on the second side in the first direction DR1 and the second side in the second direction DR2. The third outer coupling portion 153 may be located adjacent to a corner located on the first side in the first direction DR1 and the second side in the second direction DR2. The fourth outer coupling portion 154 may be located adjacent to a corner located on the first side in the first direction DR1 and the first side in the second direction DR2.

As illustrated in the drawings, the first outer coupling portion 151, the second outer coupling portion 152, the third outer coupling portion 153, and the fourth outer coupling portion 154 may have a circular shape in plan view. However, the present disclosure is not limited thereto, and the first through fourth outer coupling portions 151 through 154 may have various shapes such as an ellipse, a quadrilateral, a rhombus, or a hexagon. The first through fourth outer coupling portions 151 through 154 may have the same shape or may have different shapes.

In an embodiment, the outer coupling portions 150 may include two coupling portions located on the first side and the second side in the first direction DR1 and extending along the second direction DR2. In an embodiment, the outer coupling portions 150 may include two coupling portions located on the first side and the second side in the second direction DR2 and extending along the first direction DR1. In an embodiment, the outer coupling portions 150 may include one coupling portion disposed in a center portion of the overlap area OPA. The size, number, and shape of the outer coupling portions 150 are not limited to any one embodiment.

FIG. 5 is a plan view of the inner jig 200 in the disassembled state of the jig JIG of FIG. 3. FIG. 6 is a bottom view of the inner jig 200 in the disassembled state of the jig JIG of FIG. 3.

Referring to FIGS. 5 and 6, in addition to FIG. 3, the inner jig 200 may include a support portion 210, side portions 220, corner portions 230, and the inner coupling portions 250.

The support portion 210 may be a portion where a support surface is located. The support surface may be a surface on which an object is mounted and supported. The support portion 210 may include the support surface substantially parallel to a plane defined by the first direction DR1 and the second direction DR2.

The side portions 220 and the corner portions 230 may be located on a side of the support portion 210 to surround the support portion 210. The side portions 220 and the corner portions 230 may be immediately adjacent to the hole HOL of the jig JIG.

In an embodiment, the side portions 220 may include a first side portion 221, a second side portion 222, a third side portion 223, and a fourth side portion 224. The first side portion 221 may be adjacent to the support portion 210 on the first side in the second direction DR2. The second side portion 222 may be adjacent to the support portion 210 on the second side in the first direction DR1. The third side portion 223 may be adjacent to the support portion 210 on the second side in the second direction DR2. The fourth side portion 224 may be adjacent to the support portion 210 on the first side in the first direction DR1.

In an embodiment, the corner portions 230 may include a first corner portion 231, a second corner portion 232, a third corner portion 233, and a fourth corner portion 234. The first corner portion 231 may be located between the first side portion 221 and the second side portion 222. The second corner portion 232 may be located between the second side portion 222 and the third side portion 223. The third corner portion 233 may be located between the third side portion 223 and the fourth side portion 224. The fourth corner portion 234 may be located between the fourth side portion 224 and the first side portion 221. The first corner portion 231 may be adjacent to the support portion 210 on the second side in the first direction DR1 and the first side in the second direction DR2. The second corner portion 232 may be adjacent to the support portion 210 on the second side in the first direction DR1 and the second side in the second direction DR2. The third corner portion 233 may be adjacent to the support portion 210 on the first side in the first direction DR1 and the second side in the second direction DR2. The fourth corner portion 234 may be adjacent to the support portion 210 on the first side in the first direction DR1 and the first side in the second direction DR2.

As illustrated in FIG. 6, the inner coupling portions 250 may be disposed on a lower surface of the inner jig 200. The inner coupling portions 250 may at least partially overlap the outer coupling portions 150 in the third direction DR3. The inner coupling portions 250 may couple the outer jig 100 and the inner jig 200 to each other, together with the outer coupling portions 150 (see FIG. 4) included in the outer jig 100.

In an embodiment, as illustrated in the drawings, the inner coupling portions 250 may include a first inner coupling portion 251, a second inner coupling portion 252, a third inner coupling portion 253, and a fourth inner coupling portion 254. The first inner coupling portion 251 may be located adjacent to a corner portion located on the second side in the first direction DR1 and the first side in the second direction DR2. The second inner coupling portion 252 may be located adjacent to a corner portion located on the second side in the first direction DR1 and the second side in the second direction DR2. The third inner coupling portion 253 may be located adjacent to a corner portion located on the first side in the first direction DR1 and the second side in the second direction DR2. The fourth inner coupling portion 254 may be located adjacent to a corner portion located on the first side in the first direction DR1 and the first side in the second direction DR2.

As illustrated in the drawings, the first inner coupling portion 251, the second inner coupling portion 252, the third inner coupling portion 253, and the fourth inner coupling portion 254 may have a circular shape in plan view. However, the present disclosure is not limited thereto, and the first through fourth inner coupling portions 251 through 254 may have various shapes such as an ellipse, a quadrilateral, a rhombus, or a hexagon. The first through fourth inner coupling portions 251 through 254 may have the same shape or may have different shapes.

In an embodiment, the inner coupling portion 250 may include two coupling portions located on the first side and the second side in the first direction DR1 and extending along the second direction DR2. In an embodiment, the inner coupling portions 250 may include two coupling portions located on the first side and the second side in the second direction DR2 and extending along the first direction DR1. In an embodiment, the inner coupling portions 250 may include one coupling portion disposed in the center portion of the overlap area OPA. The size, number, and shape of the inner coupling portions 250 are not limited to any one embodiment.

FIG. 7 is a cross-sectional view of the jig JIG, taken along line X1-X1' of FIG. 3.

Referring to FIG. 7, in addition to FIGS. 4 through 6, the outer coupling portions 150 and the inner coupling portions 250 may overlap in the third direction DR3. For example, the first outer coupling portion 151 may overlap the first inner coupling portion 251 in the third direction DR3, the second outer coupling portion 152 may overlap the second inner coupling portion 252 in the third direction DR3, the third outer coupling portion 153 may overlap the third inner coupling portion 253 in the third direction DR3, and the fourth outer coupling portion 154 may overlap the fourth inner coupling portion 254 in the third direction DR3.

In some embodiments, the outer coupling portions 150 and/or the inner coupling portions 250 may be a type of magnet having magnetism. For example, the outer coupling portions 150 and/or the inner coupling portions 250 may be permanent magnets including a material such as samarium (Sm), scandium (Sc), yttrium (Y), or neodymium (Nd). In another example, the outer coupling portions 150 and the inner coupling portions 250 may be electromagnets that are magnetic when a current flows and are not magnetic when a current does not flow.

In an embodiment, when the outer coupling portions 150 and the inner coupling portions 250 are all magnets, polarities of the outer coupling portions 150 and the inner coupling portions 250 may be opposite to each other. For example, when the polarity of the outer coupling portions 150 is an N pole, the polarity of the inner coupling portions 250 may be an S pole, and when the polarity of the outer coupling portions 150 is the S pole, the polarity of the inner coupling portions 250 may be the N pole. Accordingly, the outer coupling portions 150 and the inner coupling portions 250 may be attracted to each other by the attraction of a magnetic field, causing the outer jig 100 and the inner jig 200 to be coupled to each other.

In an embodiment, when only the outer coupling portions 150 or the inner coupling portions 250 are magnets, the other coupling portions may include a material attracted by the magnetic attracting force between the magnets. For example, when only the outer coupling portions 150 or the inner coupling portions 250 are magnets, the other coupling portions may include a ferromagnetic material. Examples of the ferromagnetic material may include materials such as iron (Fe), cobalt (Co), or nickel (Ni).

The outer coupling portions 150 may be disposed adjacent to an upper surface of the outer jig 100. The inner coupling portions 250 may be disposed adjacent to the lower surface of the inner jig 200. The outer coupling portions 150 and the inner coupling portions 250 may be disposed inside the outer jig 100 and the inner jig 200, respectively.

In an embodiment, as illustrated in the drawings, the outer coupling portions 150 may be exposed to the outside on the upper surface of the outer jig 100, and the inner coupling portions 250 may be exposed to the outside on the lower surface of the inner jig 200. Accordingly, in a state where the outer jig 100 and the inner jig 200 are coupled to each other, the outer coupling portions 150 and the inner coupling portions 250 may directly contact each other.

In the printing apparatus 1 according to an embodiment, the outer jig 100 and the inner jig 200 can be detached from each other by the detachment of the outer coupling portions 150 and the inner coupling portions 250 from each other. In the printing apparatus 1 according to an embodiment, since the inner jig 200 may be detachable from the outer jig 100, the inner jig 200 can be replaced according to the size and shape of an object. Accordingly, the process cost for manufacturing the jig JIG may be reduced compared with the process cost for manufacturing an integrated jig JIG. In addition, even if the object is changed, the inner jig 200 and the pad portion 320 of the print head 300 may be replaced, and the alignment between the outer jig 100 and the print head 300 can be maintained. Therefore, the accuracy of the printing process can be improved, and the process time can be reduced.

In an embodiment, an upper surface 210*s* of the support portion 210 may be flat, and upper surfaces of the side portions 220 and the corner portions 230 may be curved surfaces extending from an outer periphery of the support portion 210 in the first direction DR1 or the second direction DR2 and then fall in the third direction DR3. For example, as illustrated in the drawings, an upper surface 222*s* of the second side portion 222 and an upper surface 224*s* of the fourth side portion 224 may have a curved shape. Although not illustrated in the drawings, an upper surface of the first side portion 221 and an upper surface of the third side portion 223 may have a curved shape. Accordingly, a distance from an inner surface 110*t* of the outer wall portion 110 to the upper surface of each side portion 220 may increase. That is, the space volume of the hole HOL may increase.

In the printing apparatus 1 according to an embodiment, the side portions 220 and the corner portions 230 may be formed as curved surfaces, and it may be possible to prevent the pad portion 320 (see FIG. 9) of the print head 300 from touching the inner jig 200 in a method S1 (see FIG. 17) of manufacturing a window member. It may be possible to prevent the pad portion 320 (see FIG. 9) of the print head 300 from touching the inner jig 200 in a method S1 (see FIG. 17) of manufacturing a window member even if the pad portion 320 of the print head 300 touches the inner jig 200, wherein it may be possible to reduce, minimize, or prevent pressure being applied to the pad portion 320 (see FIG. 9). Accordingly, ink can be accurately printed on the window member WM (see FIG. 18), and damage to the pad portion 320 (see FIG. 9) can be reduced or minimized.

Figure 9:
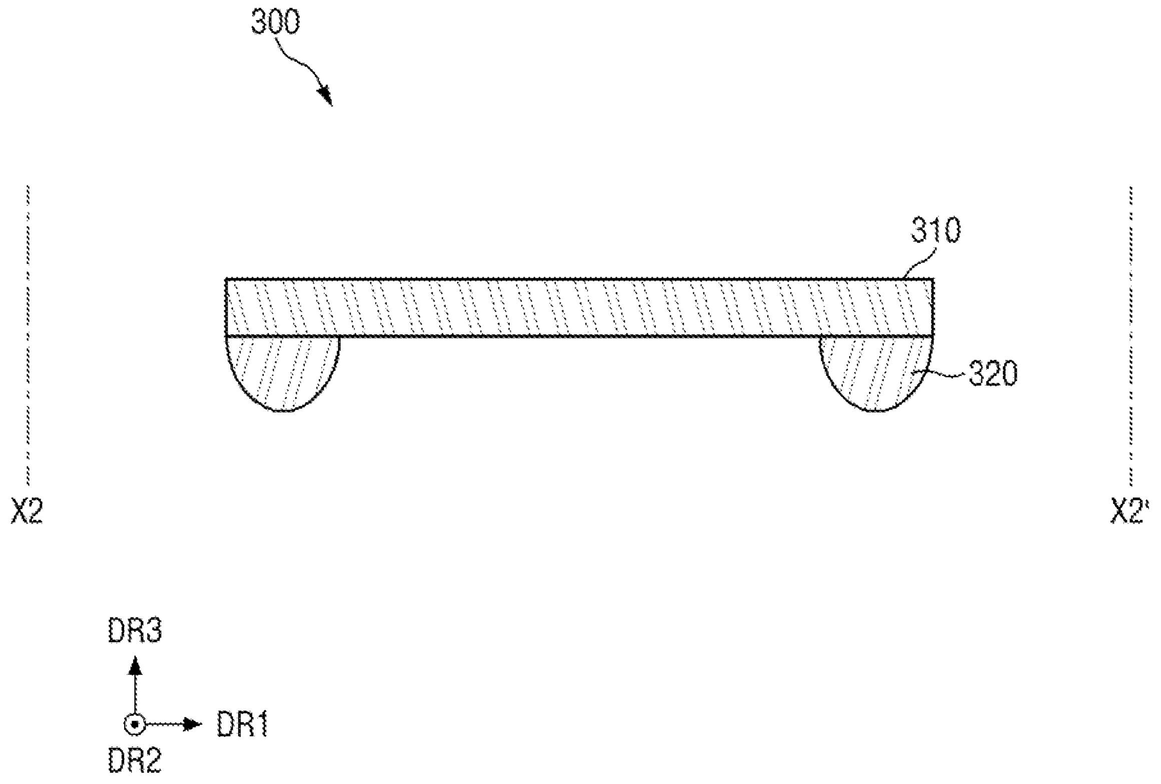
FIG. 9 is a cross-sectional view of the print head, taken along line X2-X2' of FIG. 8.

FIG. 8 is a bottom view of a print head 300 according to an embodiment. FIG. 9 is a cross-sectional view of the print head 300, taken along line X2-X2' of FIG. 8.

Referring to FIGS. 8 and 9, in addition to FIGS. 1 and 2, the print head 300 may include a head body 310 and a pad portion 320.

The head body 310 may roughly correspond to the shape of the jig JIG. In an embodiment, the head body 310 may be shaped like a rectangular parallelepiped with rounded corners, but the present disclosure is not limited thereto. The size of the head body 310 may substantially correspond to the size of the recessed portion 120 of the outer jig 100.

The pad portion 320 may overlap the hole HOL of the jig JIG in the third direction DR3. The shape and size of the pad portion 320 may correspond to the shape and size of the hole HOL in plan view. That is, the pad portion 320 may have substantially same shape as the hole HOL in plan view. For example, the pad portion 320 may include two sides extending along the first direction DR1 and facing each other in the second direction DR2, and two sides extending along the second direction DR2 and facing each other in the first direction DR1 in plan view. In addition, the pad portion 320 may include four vertices located between the sides and having a round curved shape in plan view. An opening located in the center portion and adjacent to each side of the pad portion 320 may be included. The head body 310 of the print head 300 may be exposed through the opening.

The pad portion 320 may have a certain thickness in the third direction DR3. The pad portion 320 may be shaped as a semicircle or a quadrant of a circle in cross section. Although the pad portion 320 has a semicircular shape in the drawings, the present disclosure is not limited thereto.

In a case where the pad portion 320 touches an object or the jig JIG, the shape of the pad portion 320 may be changed according to the shape of the object or the jig JIG. For example, the pad portion 320 may be made of an elastic material, preferably, may be made of a silicon material, and may deform upon contacting the object.

Based on FIG. 9, ink I (see FIG. 20) may be applied to a lower surface of the pad portion 320. At least a portion of the pad portion 320 may overlap side portions 220 of the inner jig 200. The pad portion 320 may be inserted into the hole HOL to print the ink I on upper and side surfaces of an object disposed on the inner jig 200. In a method S1 (see FIG. 17) of manufacturing a window member described herein, the ink I (see FIG. 20) applied to the lower surface of the pad portion 320 may be printed along the periphery of an object, for example, the window member WM (see FIG. 20).

Although not illustrated in the drawings, the print head 300 may further include a head driver (not illustrated). The print head 300 may be moved toward or away from the jig JIG by the operation of the head driver (not illustrated) during a printing process. For example, the print head 300 may be moved in the third direction DR3, that is, up and down, by the operation of the head driver (not illustrated). However, the present disclosure is not limited thereto, and the print head 300 may move in the first direction DR1 or the second direction DR2 according to the printing direction of the printing apparatus 1.

Since the printing apparatus 1 according to an embodiment includes the pad portion 320 having the same shape as the hole HOL in plan view, ink can be simultaneously printed on an object including a plurality of edges or corners. That is, the edges or corners of the object may be printed all at once through the pad portion 320, which includes a portion having the same shape as the object. Therefore, one or more alignment processes may be omitted, and the process time can be reduced, and the printing accuracy can be improved.

Figure 10:
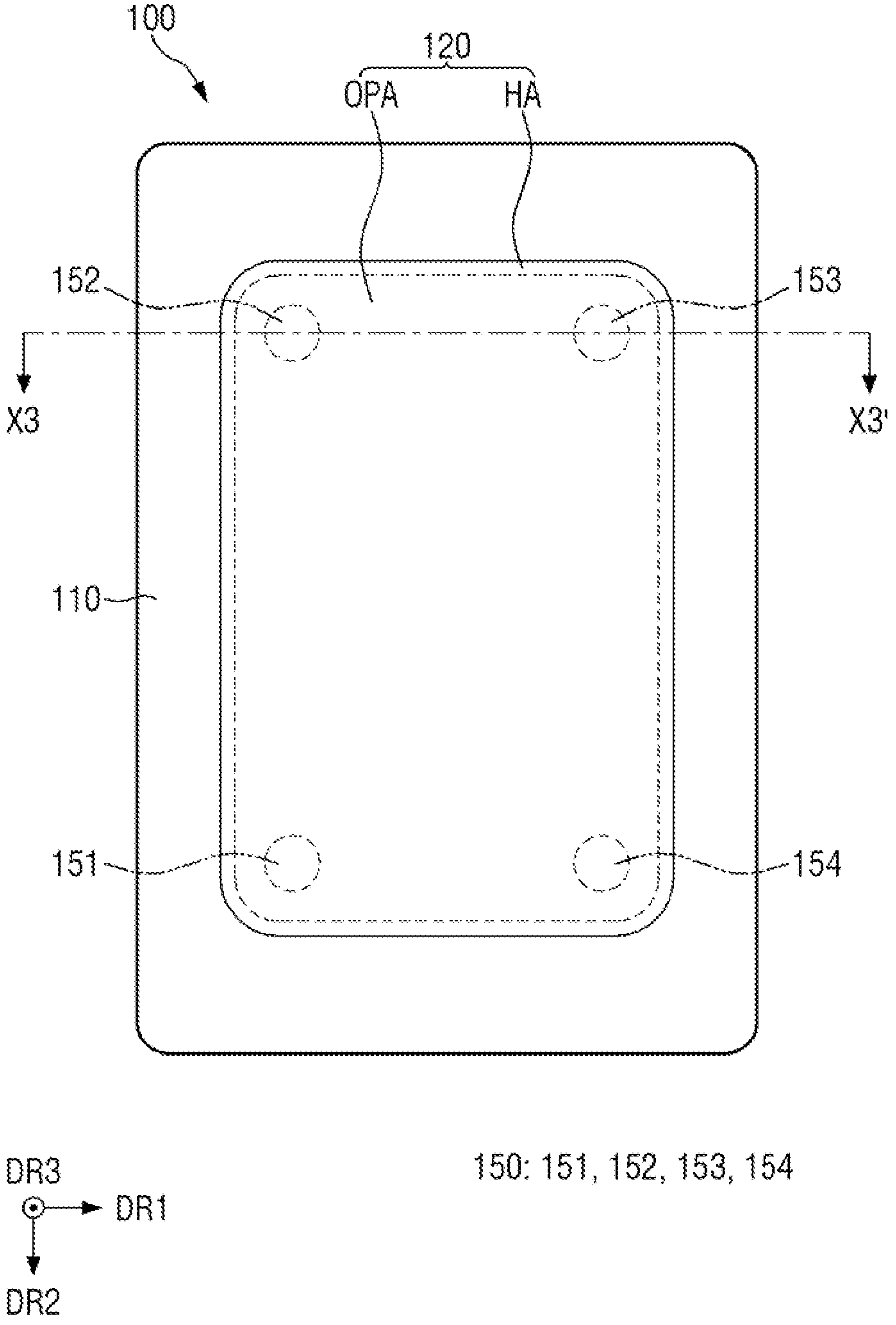
FIG. 10 is a plan view of an outer jig in a disassembled state of a jig according to an embodiment.
Figure 11:
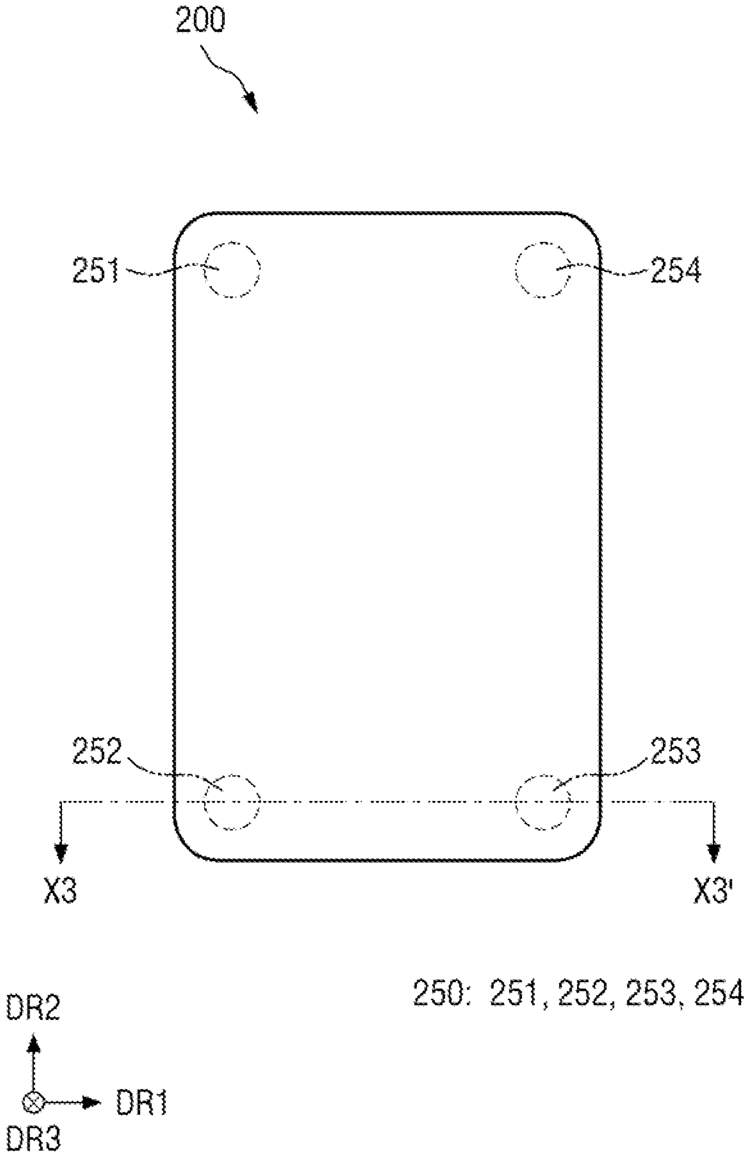
FIG. 11 is a bottom view of an inner jig in the disassembled state of the jig of FIG. 10.
Figure 12:
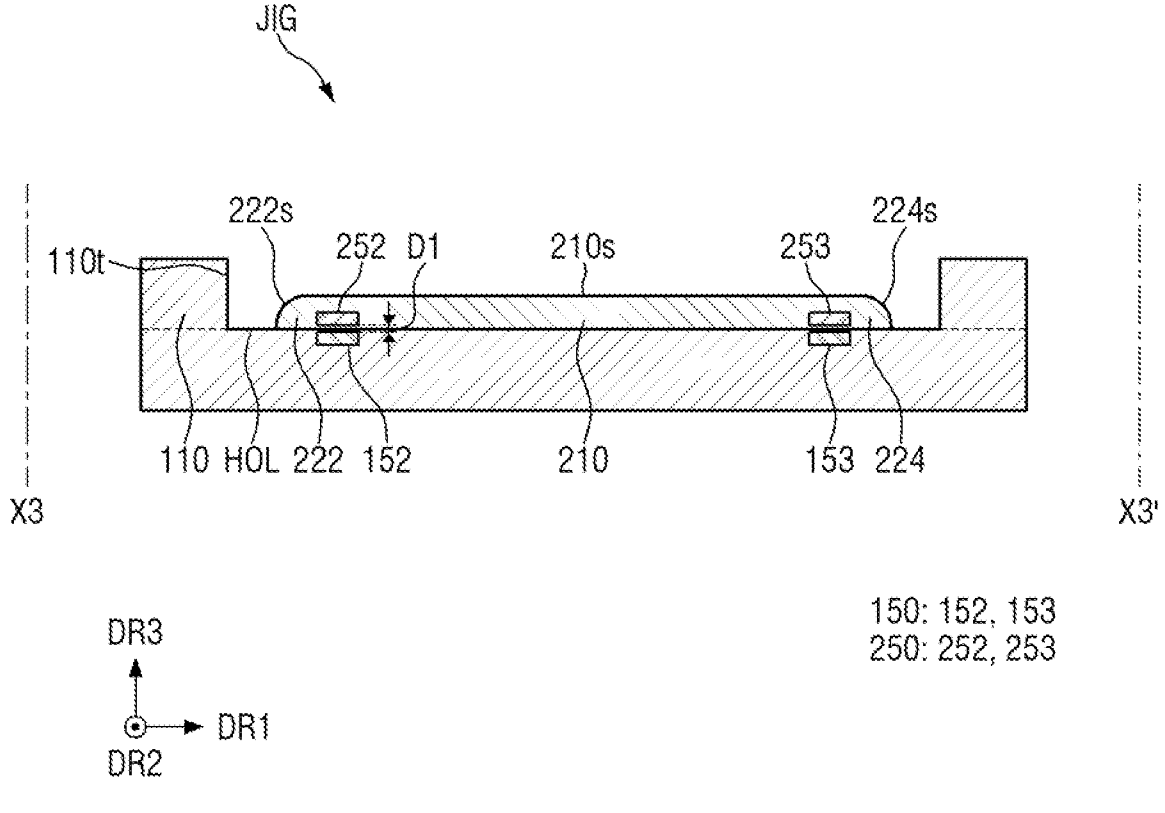
FIG. 12 is a cross-sectional view of the jig, taken along line X3-X3' of FIGS. 10 and 11.

FIG. 10 is a plan view of an outer jig 100 in a disassembled state of a jig according to an embodiment. FIG. 11 is a bottom view of an inner jig 200 in the disassembled state of the jig of FIG. 10. FIG. 12 is a cross-sectional view of the jig, taken along line X3-X3' of FIGS. 10 and 11.

Referring to FIGS. 10 through 12, a printing apparatus 1 according to an embodiment having an outer coupling portions 150 and inner coupling portions 250 that may not be exposed to the outside.

More specifically, the outer jig 100 may include the outer coupling portions 150. The outer coupling portions 150 may include a first outer coupling portion 151, a second outer coupling portion 152, a third outer coupling portion 153, and a fourth outer coupling portion 154.

The inner jig 200 may include the inner coupling portions 250. The inner coupling portions 250 may include a first inner coupling portion 251, a second inner coupling portion 252, a third inner coupling portion 253, and a fourth inner coupling portion 254.

The outer coupling portions 150 may be disposed adjacent to an upper surface of the outer jig 100. The inner coupling portions 250 may be disposed adjacent to a lower surface of the inner jig 200. The outer coupling portions 150 and the inner coupling portions 250 may be disposed inside the outer jig 100 and the inner jig 200, respectively.

Unlike in the printing apparatus 1 described with reference to FIG. 7 and other drawings, the outer coupling portions 150 may be located inside the outer jig 100 at a certain distance from the upper surface of the outer jig 100 as illustrated in FIG. 12. The inner coupling portions 250 may be disposed inside the inner jig 200 at a certain distance from the lower surface of the inner jig 200. Accordingly, the outer coupling portions 150 and the inner coupling portions 250 may be spaced apart from each other by a first distance D1 in a state where the outer jig 100 and the inner jig 200 are coupled to each other. Therefore, the outer coupling portions 150 and the inner coupling portions 250 may not be directly exposed to the outside in the plan view and the bottom view from above the outer jig 100 and below the inner jig 200, respectively.

In the printing apparatus 1 according to an embodiment, the outer coupling portions 150 and/or the inner coupling portions 250 include magnets. Therefore, the outer coupling portions 150 and the inner coupling portions 250 may be spaced a certain distance apart from each other. For example, instead of the outer coupling portions 150 and the inner coupling portions 250 directly contacting each other, the outer coupling portions 150 and the inner coupling portions 250 may be disposed apart from one another, within an effective distance of the magnetic field of the magnets. The effective distance may be a distance at which the horizontal movement of the inner jig 200 on the outer jig 100 can be substantially prevented during printing of the ink I.

Figure 13:
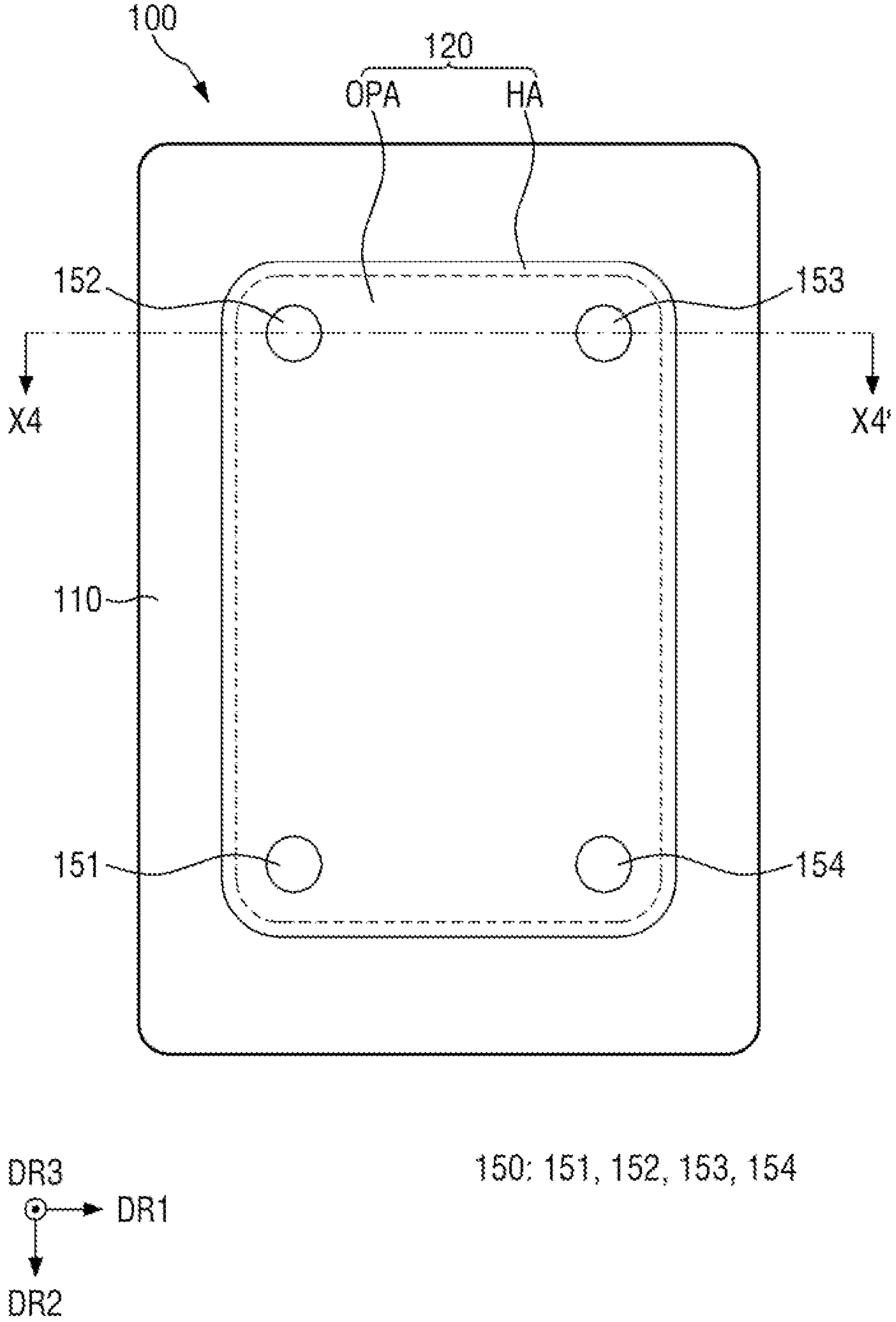
FIG. 13 is a plan view of an outer jig in a disassembled state of a jig according to an embodiment.
Figure 14:
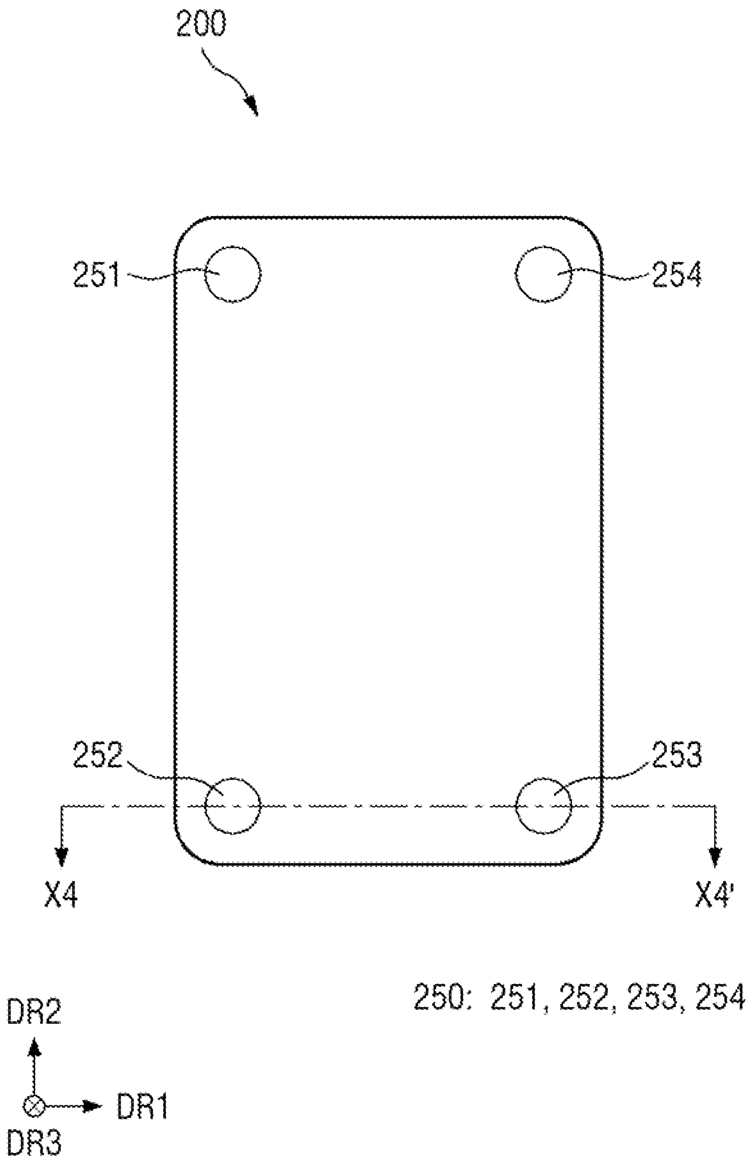
FIG. 14 is a bottom view of an inner jig in the disassembled state of the jig of FIG. 13.
Figure 15:
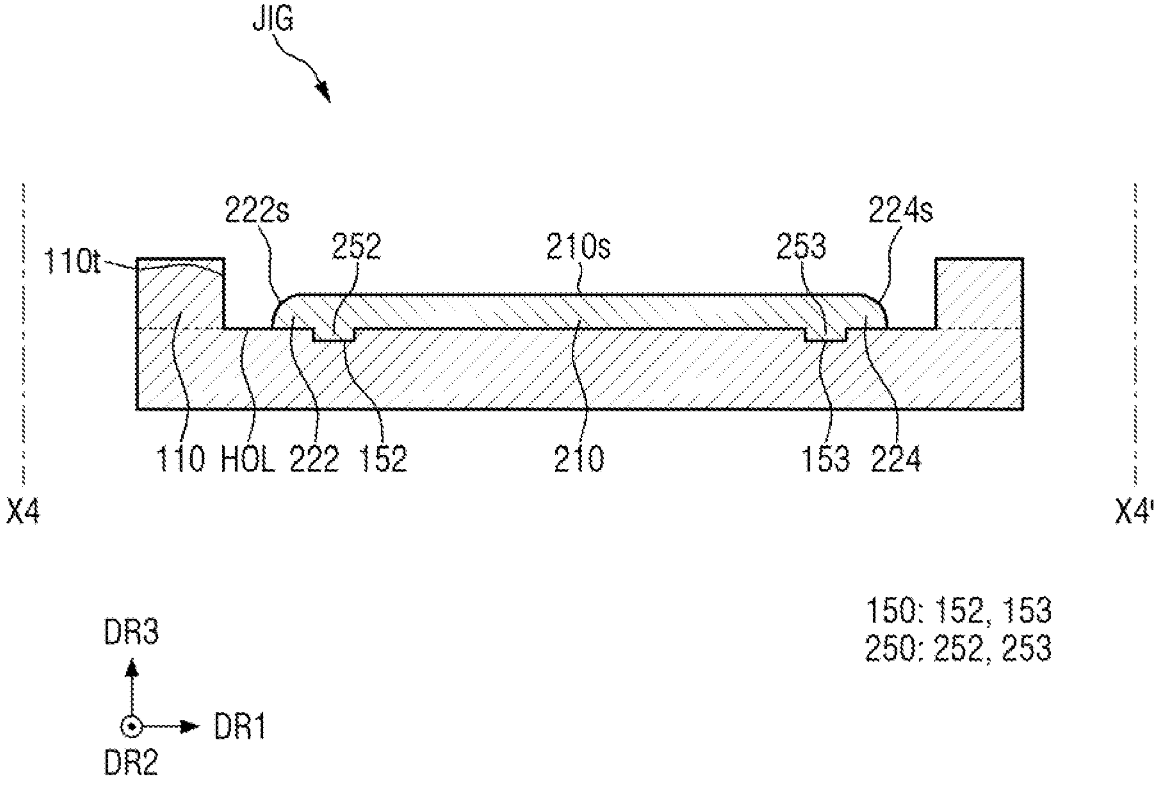
FIG. 15 is a cross-sectional view of the jig, taken along line X4-X4' of FIGS. 13 and 14.
Figure 16:
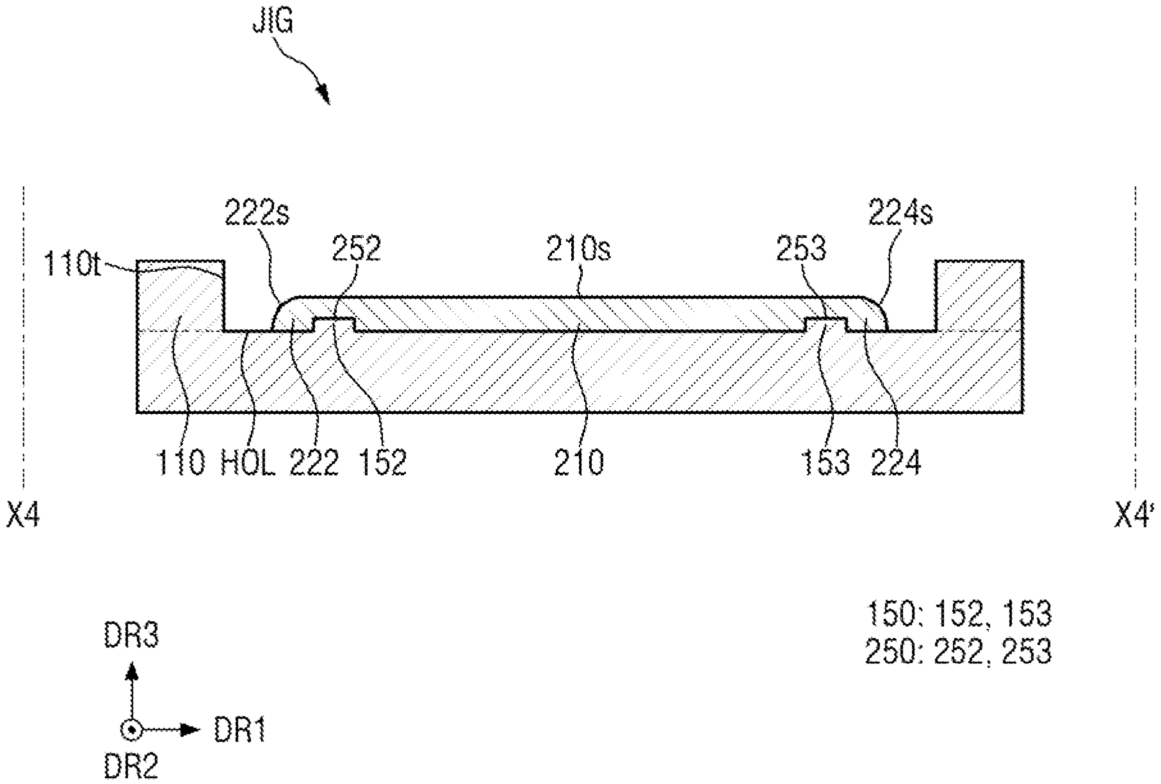
FIG. 16 is a cross-sectional view of a jig, taken along line X4-X4' of FIGS. 13 and 14.

FIG. 13 is a plan view of an outer jig 100 in a disassembled state of a jig according to an embodiment. FIG. 14 is a bottom view of an inner jig 200 in the disassembled state of the jig of FIG. 13. FIG. 15 is a cross-sectional view of the jig, taken along line X4-X4' of FIGS. 13 and 14. FIG. 16 is a cross-sectional view of a jig, taken along line X4-X4' of FIGS. 13 and 14.

Referring to FIGS. 13 through 16, a printing apparatus 1 according to an embodiment includes outer coupling portions 150 and inner coupling portions 250 that may be protrusions and recesses, respectively.

More specifically, the outer jig 100 may include the outer coupling portions 150. The outer coupling portions 150 may include a first outer coupling portion 151, a second outer coupling portion 152, a third outer coupling portion 153, and a fourth outer coupling portion 154.

The inner jig 200 may include the inner coupling portions 250. The inner coupling portions 250 may include a first inner coupling portion 251, a second inner coupling portion 252, a third inner coupling portion 253, and a fourth inner coupling portion 254.

In an embodiment, the outer coupling portions 150 and the inner coupling portions 250 may have protruding and recessed shapes. For example, the outer coupling portions 150 or the inner coupling portions 250 may have a protruding shape in the third direction DR3, and the other coupling portions may have a recessed shape.

As illustrated in FIG. 15, the outer coupling portions 150 may be recessed in a direction opposite to a direction from an upper surface of the outer jig 100 toward the inner jig 200, that is, may be recessed in a downward direction, and the inner coupling portions 250 may protrude in a direction from a lower surface of the inner jig 200 toward the outer jig 100, that is, may protrude in the downward direction. For example, the outer coupling portions 150 may be recessed in the upper surface of the outer jig 100 and the inner coupling portions 250 may protrude from the lower surface of the inner jig 200, and the inner coupling portions 250 may fit within the outer coupling portions 150 in a state where the outer jig 100 and the inner jig 200 are coupled to each other. In another example, the outer coupling portions 150 may protrude from the upper surface of the outer jig 100 and the inner coupling portions 250 may be recessed in the lower surface of the inner jig 200, and the outer coupling portions 150 may fit within the inner coupling portions 250 in a state where the outer jig 100 and the inner jig 200 are coupled to each other.

In another example, as illustrated in FIG. 16, the outer coupling portions 150 may protrude in the direction from the upper surface of the outer jig 100 toward the inner jig 200, that is, may protrude in an upward direction, and the inner coupling portions 250 may be recessed in a direction opposite to the direction from the lower surface of the inner jig 200 toward the outer jig 100, that is, may be recessed in the upward direction.

In some embodiments, the outer coupling portions 150 and the inner coupling portions 250 may have widths in a horizontal direction that enable coupling thereof. Since the outer coupling portions 150 or the inner coupling portions 250 have a protruding shape while the other coupling portions have a recessed shape and the outer coupling portions 150 and the inner coupling portions 250 have the same width, the outer jig 100 and the inner jig 200 may be coupled to each other. Accordingly, sidewalls of the outer coupling portions 150, which extend in the third direction DR3, and sidewalls of the inner coupling portions 250, which extend in the third direction DR3, may directly contact and engage with each other.

In the printing apparatus 1 according to an embodiment, since the outer coupling portions 150 and the inner coupling portions 250 have protruding and recessed shapes instead of including magnets, they can be physically directly coupled to each other. Accordingly, the horizontal movement of the inner jig 200 on the outer jig 100 can be reduced, minimized, or eliminated.

A method of manufacturing a window member using a printing apparatus according to an embodiment will now be described.

Figure 17:
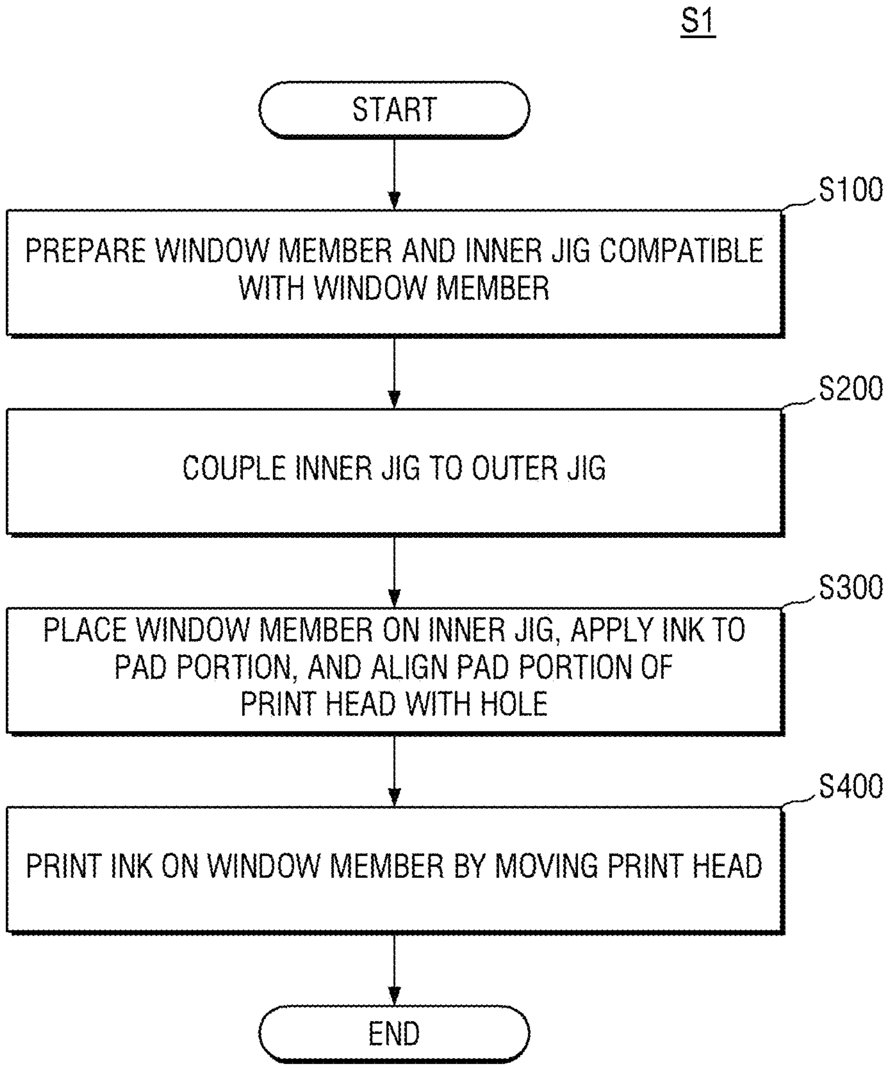
FIG. 17 is a flowchart illustrating a method of manufacturing a window member according to an embodiment.
Figure 18:
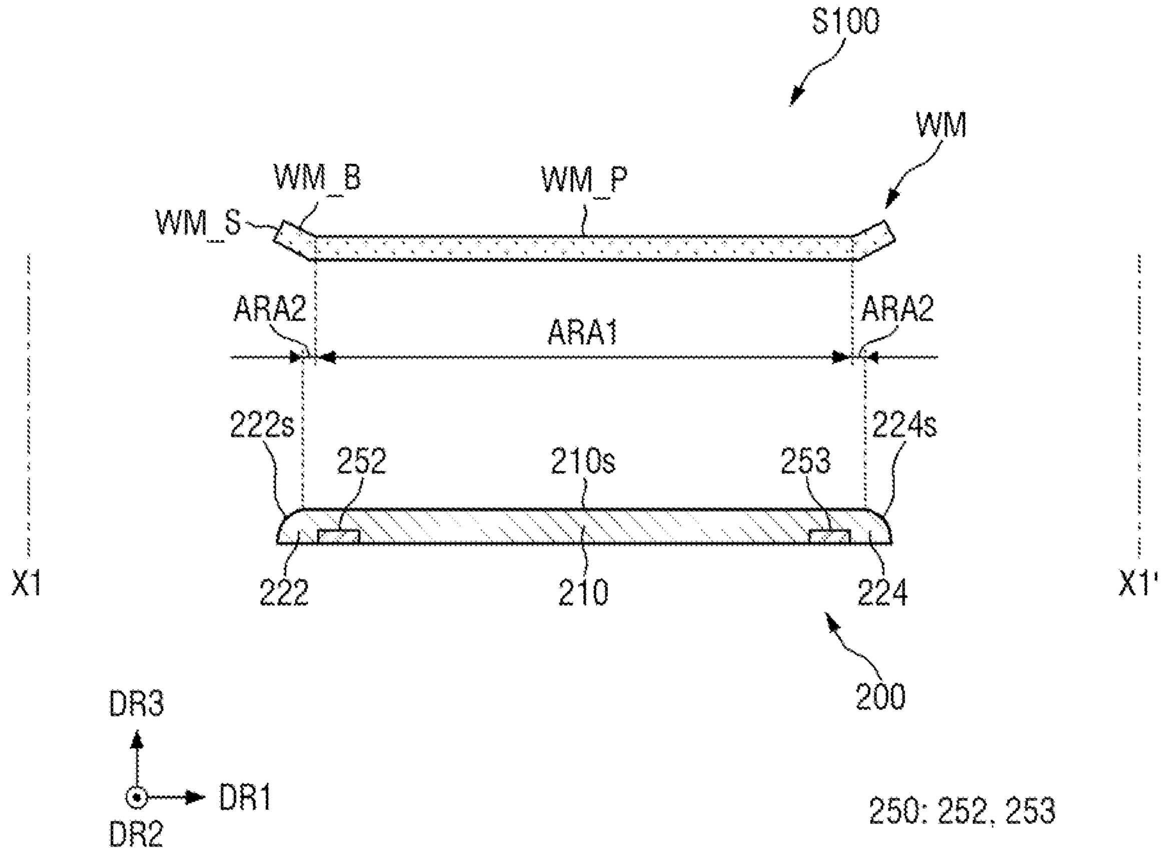
FIG. 18 is a cross-sectional view illustrating operation S100 of FIG. 17.
Figure 19:
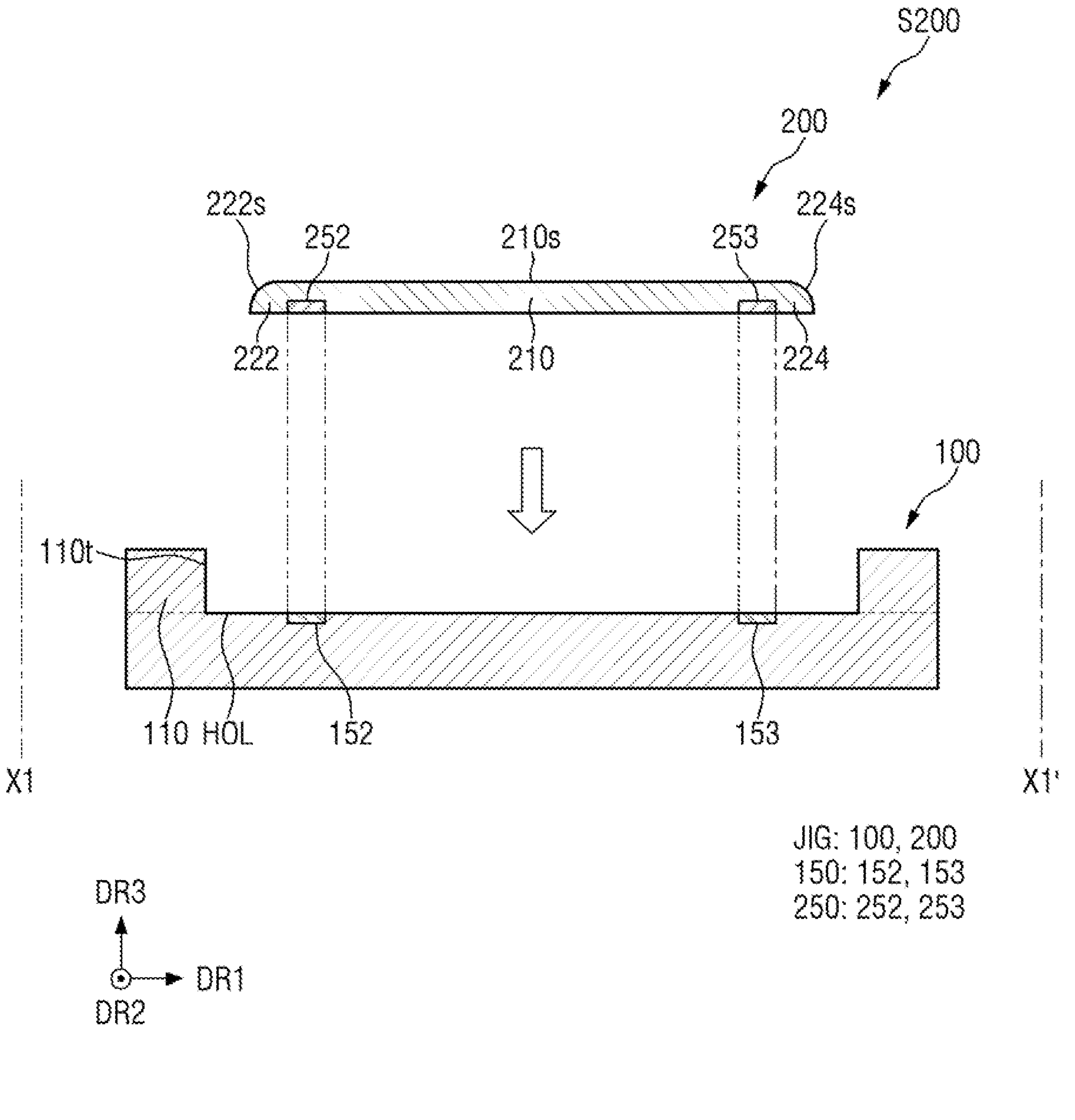
FIG. 19 is a cross-sectional view illustrating operation S200 of FIG. 17.
Figure 20:
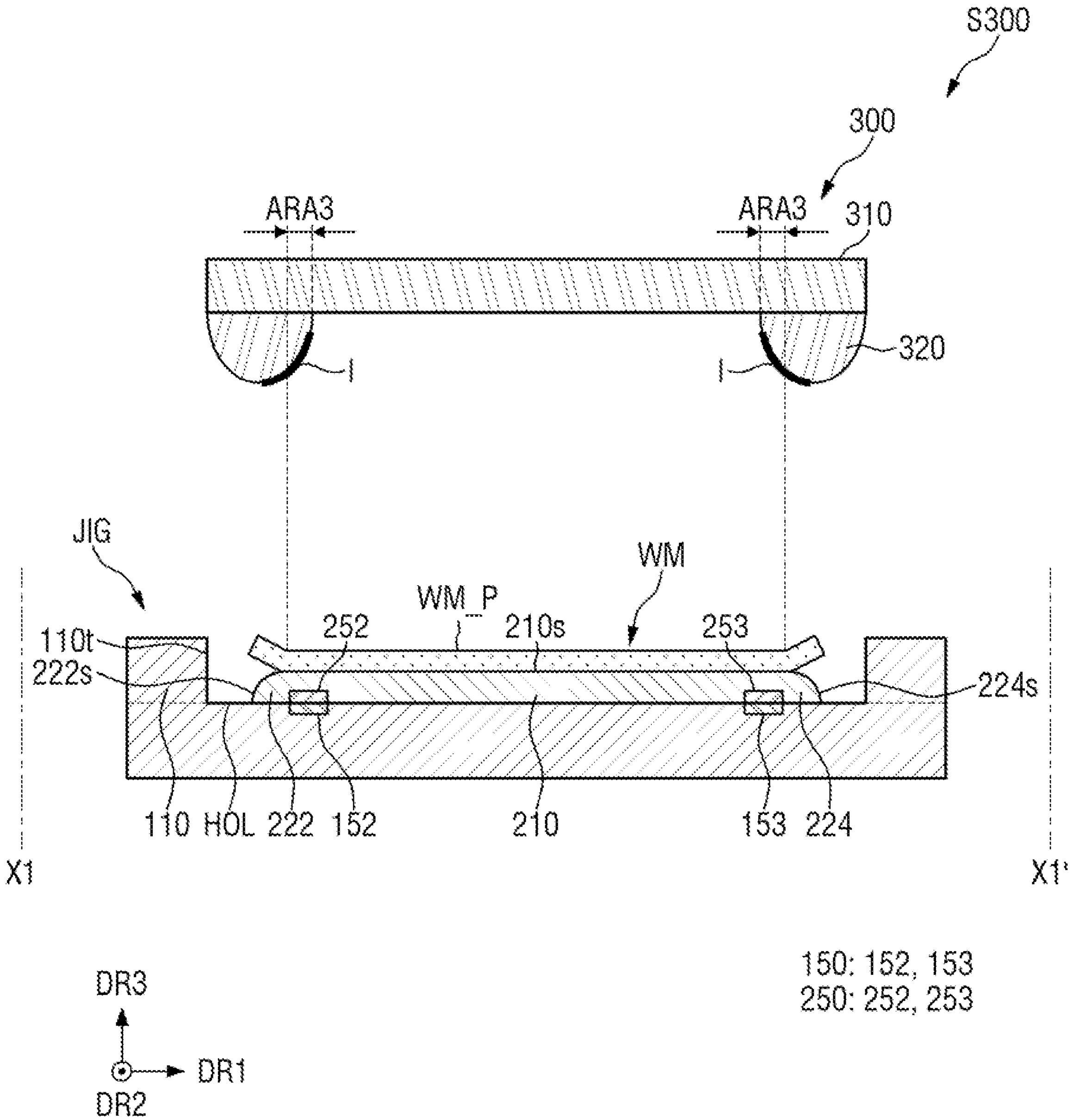
FIG. 20 is a cross-sectional view illustrating operation S300 of FIG. 17.
Figure 21:
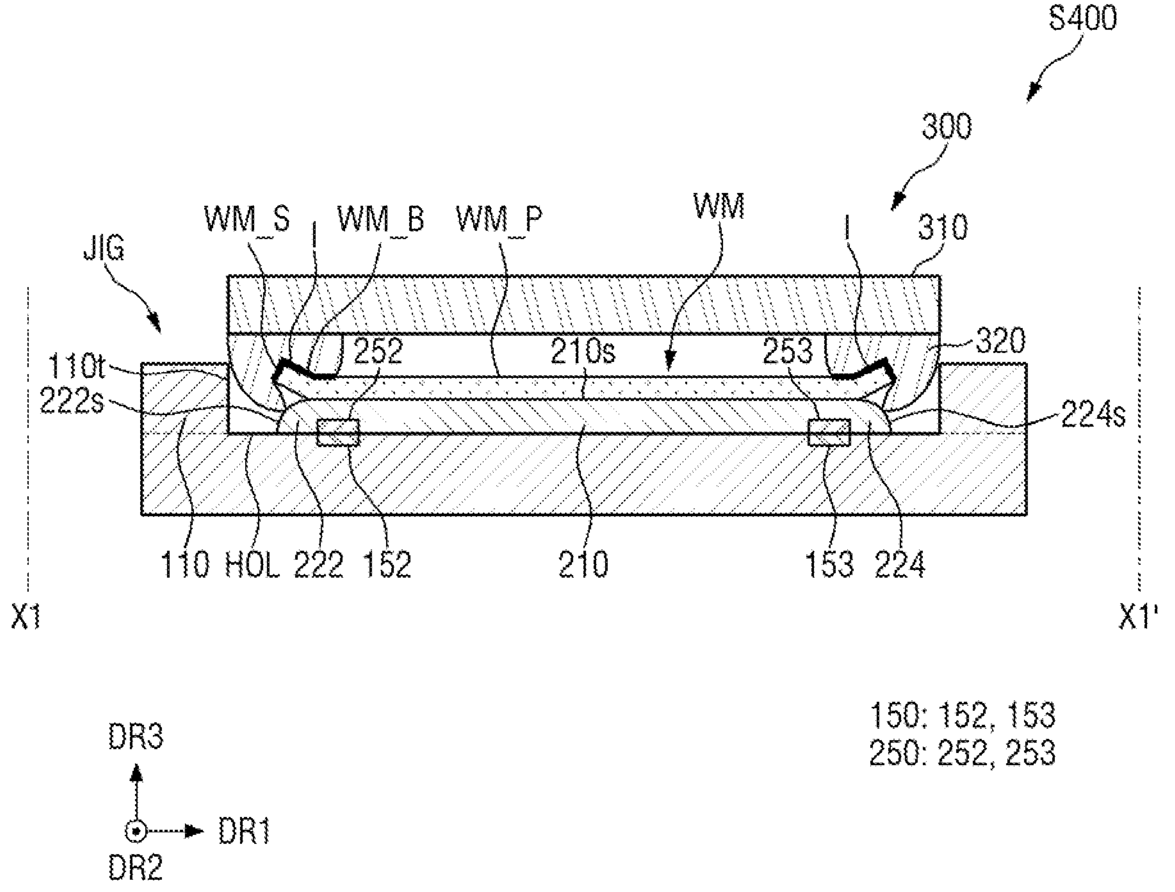
FIG. 21 is a cross-sectional view illustrating operation S400 of FIG. 17.

FIG. 17 is a flowchart illustrating a method of manufacturing a window member according to an embodiment. FIG. 18 is a cross-sectional view illustrating operation S100 of FIG. 17. FIG. 19 is a cross-sectional view illustrating operation S200 of FIG. 17. FIG. 20 is a cross-sectional view illustrating operation S300 of FIG. 17. FIG. 21 is a cross-sectional view illustrating operation S400 of FIG. 17.

Referring to FIGS. 17 through 21, a method S1 of manufacturing the window member may include preparing a window member and an inner jig compatible with the window member (operation S100), coupling the inner jig to an outer jig (operation S200), placing the window member on the inner jig, applying ink to a pad portion, and aligning the pad portion of a print head with a hole (operation S300), and printing the ink on the window member by moving the print head (operation S400).

In the preparing of the window member and the inner jig compatible with the window member (operation S100), a window member WM may have a flat shape substantially parallel to a horizontal direction defined by the first direction DR1 and the second direction DR2 or may have a 3D shape having an edge portion bent in the third direction DR3. Although the present disclosure is not limited to any one embodiment, a case where the window member WM has a 3D shape will be described as an example for ease of description.

The window member WM may include a flat portion WM_P substantially parallel to the horizontal direction defined by the first direction DR1 and the second direction DR2, a bending portion WM_B surrounding the flat portion WM_P and located on one side of the flat portion WM_P, and an outer side surface WM_S surrounding the bending portion WM_B and located on a side of the bending portion WM_B.

The flat portion WM_P may extend in the horizontal direction defined by the first direction DR1 and the second direction DR2. The flat portion WM_P may be placed on a support portion 210 of an inner jig 200 during a printing process. The shape of the flat portion WM_P may be similar to that of the support portion 210 of the inner jig 200. A lower surface of the flat portion WM_P may directly contact an upper surface 210*s* of the support portion 210 of the inner jig 200. Here, the lower surface of the flat portion WM_P may be an upper surface, that is, a display surface of a display device DD (see FIG. 23) to be described later. That is, the window member WM illustrated in FIG. 18 may be a window member WM of the display device DD of FIG. 23 turned upside down.

The area of the flat portion WM_P may be smaller than or equal to the area of the support portion 210 of the inner jig 200. In a case where the area of the flat portion WM_P is smaller than the area of the support portion 210 of the inner jig 200, a boundary between the flat portion WM_P and the bending portion WM_B, that is, an outer periphery of the flat portion WM_P, may be located inside an outer periphery of the support portion 210 of the inner jig 200. Therefore, the outer periphery of the flat portion WM_P may be located on the support portion 210 of the inner jig 200. Accordingly, the support portion 210 of the inner jig 200 may include an area ARA1 overlapping the flat portion WM_P of the window member WM and an area ARA2 not overlapping the flat portion WM_P of the window member WM.

The bending portion WM_B may surround the flat portion WM_P and may be located on one side of the flat portion WM_P. The bending portion WM_B may be an edge portion of the flat portion WM_P bent in the third direction DR3. During the printing process, at least a portion of the bending portion WM_B may overlap the support portion 210, side portions 220, and corner portions 230 of the inner jig 200 in the third direction DR3.

The outer side surface WM_S may surround the bending portion WM_B and may be located on one side of the bending portion WM_B. The outer side surface WM_S may be a side portion connecting upper and lower surfaces of the bending portion WM_B. During the printing process, a portion of the outer side surface WM_S may overlap the side portions 220 and the corner portions 230 of the inner jig 200, and a hole HOL of a jig JIG in the third direction DR3.

In a method S1 of manufacturing the window member according to an embodiment, the flat portion WM_P, the bending portion WM_B, and the outer side surface WM_S may be areas where ink I may be printed. For example, the ink I may be printed on at least a portion of the upper surface of the flat portion WM_P, which may be adjacent to the bending portion WM_B, at least a portion of the upper surface of the bending portion WM_B, and at least a portion of the outer side surface WM_S.

In a method S1 of manufacturing the window member according to an embodiment, the inner jig 200 compatible with the shape and size of the window member WM may be provided. For example, when the size of the window member WM increases, the size of the support portion 210 of the inner jig 200 may be increased to match the size of the flat portion WM_P of the window member WM. In the printing process, the shape of the jig JIG may be changed according to the type of object. In a method S1 of manufacturing the window member according to an embodiment, in a case where an object is changed, the inner jig 200 and a pad portion 320 of a print head 300 may be replaced, and the alignment between an outer jig 100 and the print head 300 can be maintained. Therefore, the accuracy of the printing process can be improved, and the process time can be reduced.

In the coupling of the inner jig to the outer jig (operation S200), when the inner jig 200 compatible with the window member WM is prepared, the inner jig 200 may be coupled to the outer jig 100. Here, the inner jig 200 may be coupled to the outer jig 100 such that outer coupling portions 150 of the outer jig 100 and inner coupling portions 250 of the inner jig 200 overlap each other in the third direction DR3.

In an embodiment, the outer coupling portions 150 and/or the inner coupling portions 250 may be magnets, and the outer jig 100 and the inner jig 200 may be coupled to each other by a magnetic attraction force between adjacent magnets in the third direction DR3.

In an embodiment, the outer coupling portions 150 and the inner coupling portions 250 may have protruding and recessed shapes, respectively, the outer jig 100 and the inner jig 200 may be coupled to each other by inserting one of the outer jig 100 and the inner jig 200 into the other jig.

In the placing of the window member on the inner jig, the applying of the ink to the pad portion, and the aligning of the pad portion of the print head with the hole (operation S300), the window member WM may be placed on the inner jig 200 coupled to the outer jig 100. The window member WM may be placed such that a lower surface of the window member WM directly contacts the support portion 210 of the inner jig 200. That is, the window member WM may be placed such that a bending direction of the bending portion WM_B is an upward direction in the drawings.

The Ink I may be applied to the pad portion 320. In an embodiment, the ink I may be applied on an intaglio plate, and the pad portion 320 may be brought into contact with the intaglio plate and coated with the ink I. In an embodiment, the ink I may be directly applied on the pad portion 320 through an inkjet device or the like.

The ink I may include a light blocking material. For example, the ink I may include black carbon particles or light-blocking metal particles. The ink I may harden on the window member WM to form a light blocking portion BM (see FIG. 23).

The pad portion 320 of the print head 300 may be aligned to overlap the hole HOL of the jig JIG in the third direction DR3. In an embodiment, the pad portion 320 may be aligned to overlap at least a portion of the flat portion WM_P, the bending portion WM_B, and the outer side surface WM_S of the window member WM. For example, the flat portion WM_P of the window member WM may include an area ARA3 overlapping the pad portion 320.

In the printing of the ink on the window member by moving the print head (operation S400), a head driver (not illustrated) of the print head 300 may operate to move the print head 300. The print head 300 may move toward the jig JIG. For example, in a case that the print head 300 is positioned above the jig JIG based on the drawings, the print head 300 may move downward.

While the print head 300 is moving, the pad portion 320 may touch the window member WM. The pad portion 320 may be formed of an elastic material. As the pad portion 320 touches the window member WM, the shape of the pad portion 320 may change according to the shape of the window member WM. For example, the elastic material of the pad portion 320 may be deformed according to the shape of the window member WM.

At least a portion of the pad portion 320 of the print head 300 may move into the hole HOL of the jig JIG. When the print head 300 is in a lowered state, a lower end of the pad portion 320 may be located at a position lower than an upper surface of an outer wall portion 110 of the outer jig 100.

The ink I applied to the pad portion 320 may contact the flat portion WM_P, the bending portion WM_B, and the outer side surface WM_S of the window member WM. Accordingly, the ink I may be printed on the flat portion WM_P, the bent portion WM_B, and the outer side surface WM_S of the window member WM.

In a method S1 of manufacturing the window member according to an embodiment, the inner jig 200 may be smaller than a recessed portion 120 of the outer jig 100 to form the hole HOL, and the side portions 220 and the corner portions 230 of the inner jig 200 may be formed as curved surfaces. Therefore, it may be possible to prevent the pad portion 320 from touching the inner jig 200 or, in a case where the pad portion 320 touches the inner jig 200, possible to reduce, minimize, or prevent pressure being applied to the pad portion 320. Accordingly, the ink I can be accurately printed on the window member WM, and damage to the pad portion 320 can be reduced, minimized, or prevented.

In a method S1 of manufacturing the window member according to an embodiment, the pad portion 320 overlaps the hole HOL of the jig JIG in the third direction DR3, and the shape and size of the pad portion 320 correspond to the shape and size of the hole HOL in plan view. Therefore, sides and corners of the window member WM may be printed simultaneously. That is, the sides and corners included in the window member WM may be printed simultaneously through the pad portion 320 having the same shape as the window member WM. Therefore, one or more alignment processes may be omitted, and the process time can be reduced, and the printing accuracy can be improved.

Hereinafter, an example of a display device including a window member manufactured using a printing apparatus according to an embodiment and a method of manufacturing a window member according to an embodiment will be described.

Figure 22:
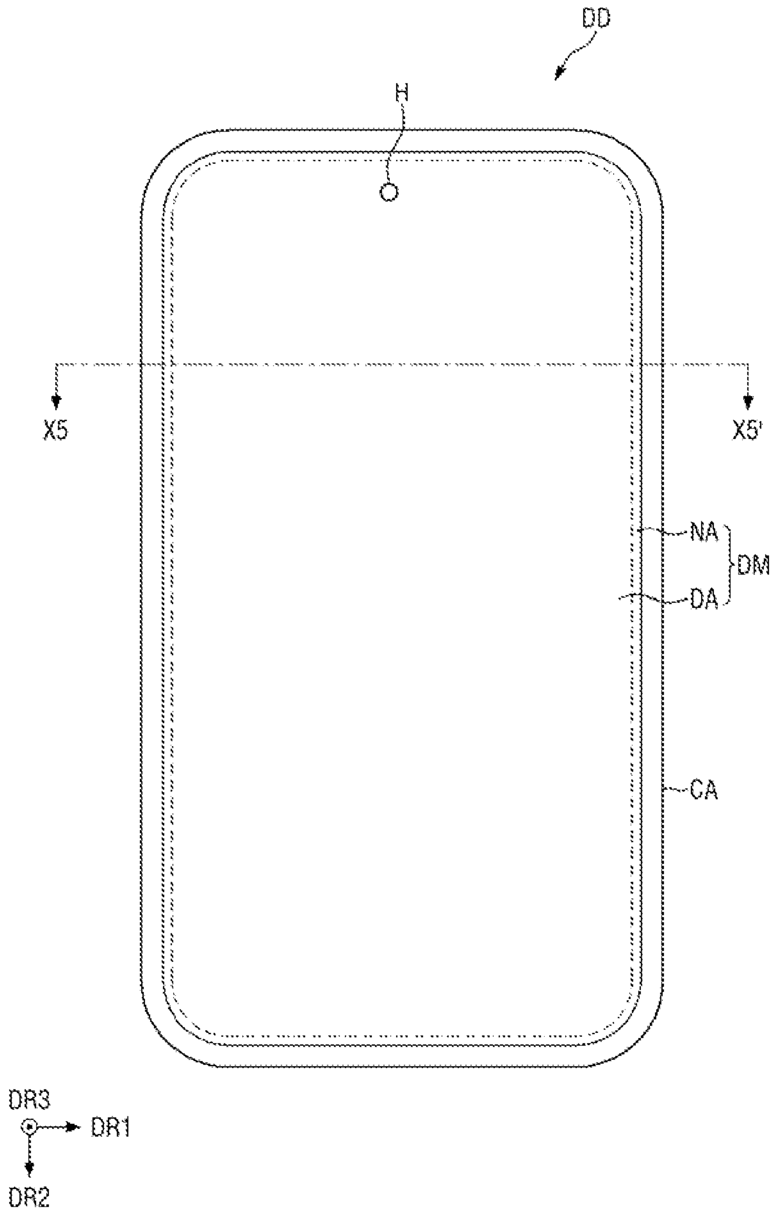
FIG. 22 is a plan view of a display device according to an embodiment.

FIG. 22 is a plan view of a display device DD according to an embodiment.

Referring to FIG. 22, the display device DD may be applied to large display devices such as televisions or monitors, as well as to small and medium-sized display devices such as smartphones, tablet PCs, car navigation devices, game consoles, or smart watches. In an embodiment, the display device DD is illustrated as a smartphone.

The display device DD may include a display module DM including a display panel. In an embodiment, the display device DD may further include additional elements. For example, the display device DD may include a case member CA to protect the display module DM.

The display module DM may include a display area DA and a non-display area NA located around the display area DA. The display area DA may include pixels for displaying an image. In an embodiment, a light-transmitting hole area H corresponding to a camera or the like (e.g., a non-pixel area in which pixels are not disposed or a low-resolution area in which pixels are disposed in a low resolution) may be disposed in the display area DA, but embodiments are not limited thereto. The non-display area NA may be disposed on at least one side of the display area DA and may partially or entirely surround the display area DA. Wirings, pads, and/or at least one driving circuit electrically connected to the pixels of the display area DA may be disposed in the non-display area NA. The non-display area NA may be an area where a light blocking portion BM (see FIG. 23) may be located, that is, an area overlapping the light blocking portion BM (see FIG. 23) in the third direction DR3.

The case member CA may be coupled to the display module DM to protect the display module DM from impact applied from the outside. For example, the case member CA may be located on side surfaces and/or rear surface of the display device DD to surround the side surfaces and/or rear surface of the display module DM.

The display device DD may have various shapes. For example, the display device DD may have a substantially rectangular shape on a plane defined by the first direction DR1 and the second direction DR2. For example, the display device DD may include two first sides extending in the first direction DR1 and two second sides extending in the second direction DR2 on the plane. In an embodiment, the first sides may be, but not necessarily, shorter than the second sides.

The display device DD may have angled corners or rounded corners. For example, each corner where a first side and a second side of the display device DD meet may form a right angle or a curved surface.

The planar shape of the display device DD is not limited to the exemplified shape and may be changed to a circular shape, an elliptical shape, or other shapes. In addition, although FIG. 22 illustrates an embodiment in which a display surface of the display device DD including the display area DA may be flat, embodiments are not limited thereto. For example, the display surface of the display device DD may include a curved surface in at least a portion.

Figure 23:
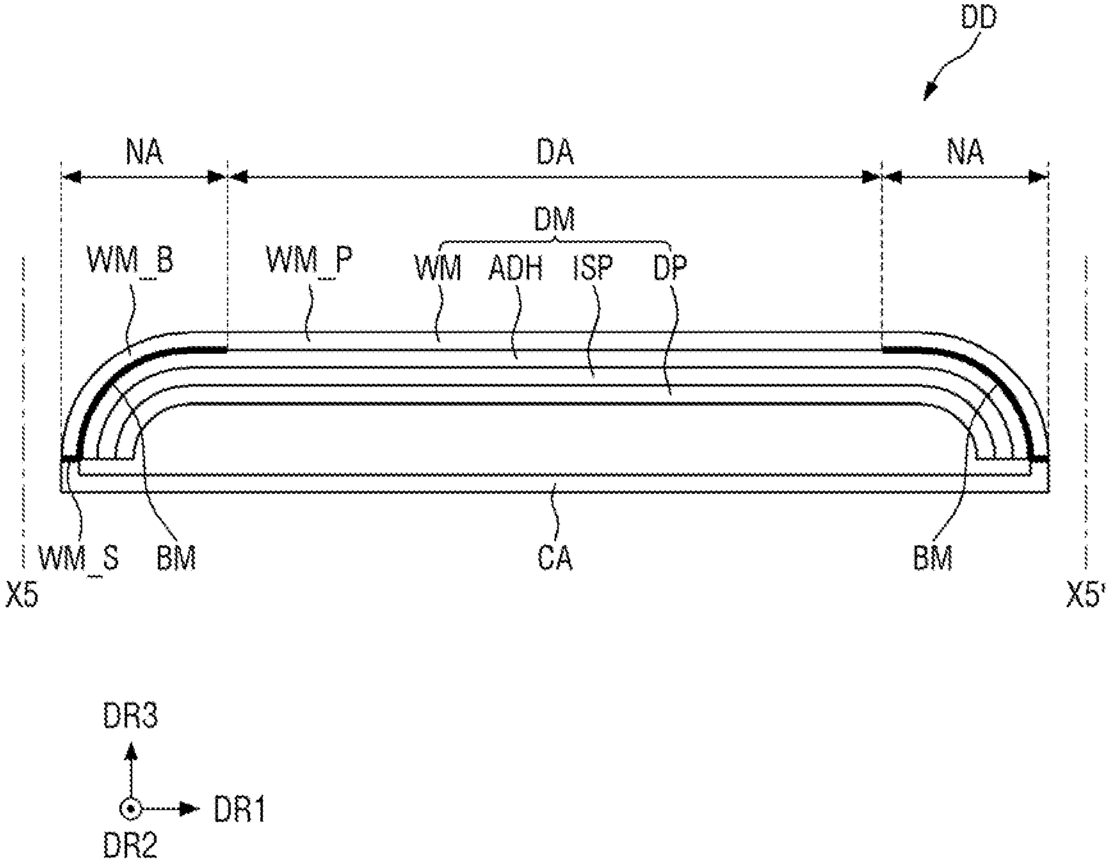
FIG. 23 is a cross-sectional view of the display device, taken along line X5-X5' of FIG. 22.

FIG. 23 is a cross-sectional view of the display device DD, taken along line X5-X5' of FIG. 22.

Referring to FIG. 23, in addition to FIG. 22, the display module DM may include a display panel DP, an input sensing panel ISP, an adhesive member ADH, and a window member WM.

The display panel DP may include a light emitting display panel. The light emitting display panel may be, for example, an organic light emitting display panel or a quantum dot light emitting display panel. A light emitting layer of the organic light emitting display panel may include an organic light emitting material. A light emitting layer of the quantum dot light emitting display panel may include quantum dots and quantum rods. The display panel DP is not particularly limited in the present disclosure. In an embodiment, the display panel DP is illustrated as an organic light emitting display panel, which is described herein with reference to FIG. 24.

The input sensing panel ISP may be disposed on the display panel DP. The input sensing panel ISP may be directly disposed on the display panel DP or may be coupled to the display panel DP by an adhesive member.

In some embodiments, the input sensing panel ISP may sense an external input by sensing a change in capacitance caused by an external object. In this case, the input sensing panel ISP may be a capacitive input sensing panel. In an embodiment, the input sensing panel ISP may sense an external input by sensing a change in pressure caused by an external object. In this case, the input sensing panel ISP may be a pressure sensitive input sensing panel.

The adhesive member ADH may be disposed between the window member WM and the input sensing panel ISP. The adhesive member ADH may bond the window member WM and the input sensing panel ISP together. The adhesive member ADH may include, for example, a general adhesive or a gluing agent. For example, the adhesive member ADH may include a pressure sensitive adhesive (PSA), an optical clear adhesive (OCA), or an optical clear resin (OCR). In an embodiment, the adhesive member ADH may be omitted.

The window member WM may be disposed on the adhesive member ADH. The window member WM may cover the display panel DP. The window member WM may completely cover the display area DA and the non-display area NA of the display device DD. The shape of the display panel DP may correspond to the shape of the window member WM. The window member WM may protect the display panel DP from external impact and provide an input surface to a user.

The window member WM may allow light generated by the display panel DP to pass therethrough. For example, the window member WM may be transparent. The window member WM may include, for example, a glass or plastic material. In some embodiments, when the window member WM includes glass, it may include strengthened glass. For example, the window member WM may be chemically ion-exchanged strengthened glass. In an embodiment, when the window member WM includes plastic, it may include a polyimide (PI) film.

In some embodiments, the window member WM may be manufactured by the printing apparatus 1 of described above with reference to FIG. 1 and other drawings, and may be manufactured by a method S1 of manufacturing the window member of described above with reference to FIG. 17 and other drawings. For example, the light blocking portion BM located in the non-display area NA along the edges of the window member WM may be formed by hardening the ink I used in the above-described method S1 of manufacturing the window member.

The light blocking portion BM may be disposed in the non-display area NA. The light blocking portion BM may be located on at least any one of a flat portion WM_P, a bending portion WM_B, and an outer side surface WM_S of the window member WM. For example, the light blocking portion BM may be disposed on at least a portion of the flat portion WM_P, at least a portion of the bending portion WM_B, and at least a portion of the outer side surface WM_S.

The light blocking portion BM may reduce or prevent leakage of light in the periphery of the display device DD. The light blocking portion BM may be located on a surface in contact with the case member CA. For example, the light blocking portion BM may be located on the outer side surface WM_S. The light blocking portion BM may improve the adhesion between the window member WM and the case member CA.

The case member CA may be disposed under the display module DM. The case member CA may be adjacent to the display area DA. The case member CA may have a predetermined color. The case member CA may be disposed on an outermost side of the display device DD and may accommodate components therein. The case member CA may include a bottom surface and sidewalls extending from the bottom surface. In addition, electronic modules (not illustrated) may be accommodated in an internal space defined by the bottom surface and the sidewalls. The electronic modules may include, for example, a camera, a flash, a fingerprint sensor, a battery, or a function sensor. The function sensor may include, for example, a proximity sensor, a color density detection sensor, an illuminance sensor, a motion sensor, or a heart rate sensor. However, these are examples, and the function sensor is not limited to the above examples. In addition, one or more of the camera, the flash, the fingerprint sensor, the battery, or the function sensor may be omitted, and other electronic modules may be additionally disposed.

The case member CA may include a material having relatively high rigidity as compared with the display module DM. For example, the case member CA may include a plurality of frames and/or plates made of glass, plastic, metal, or a combination thereof. The case member CA may stably protect elements of the display device DD from an external impact.

Figure 24:
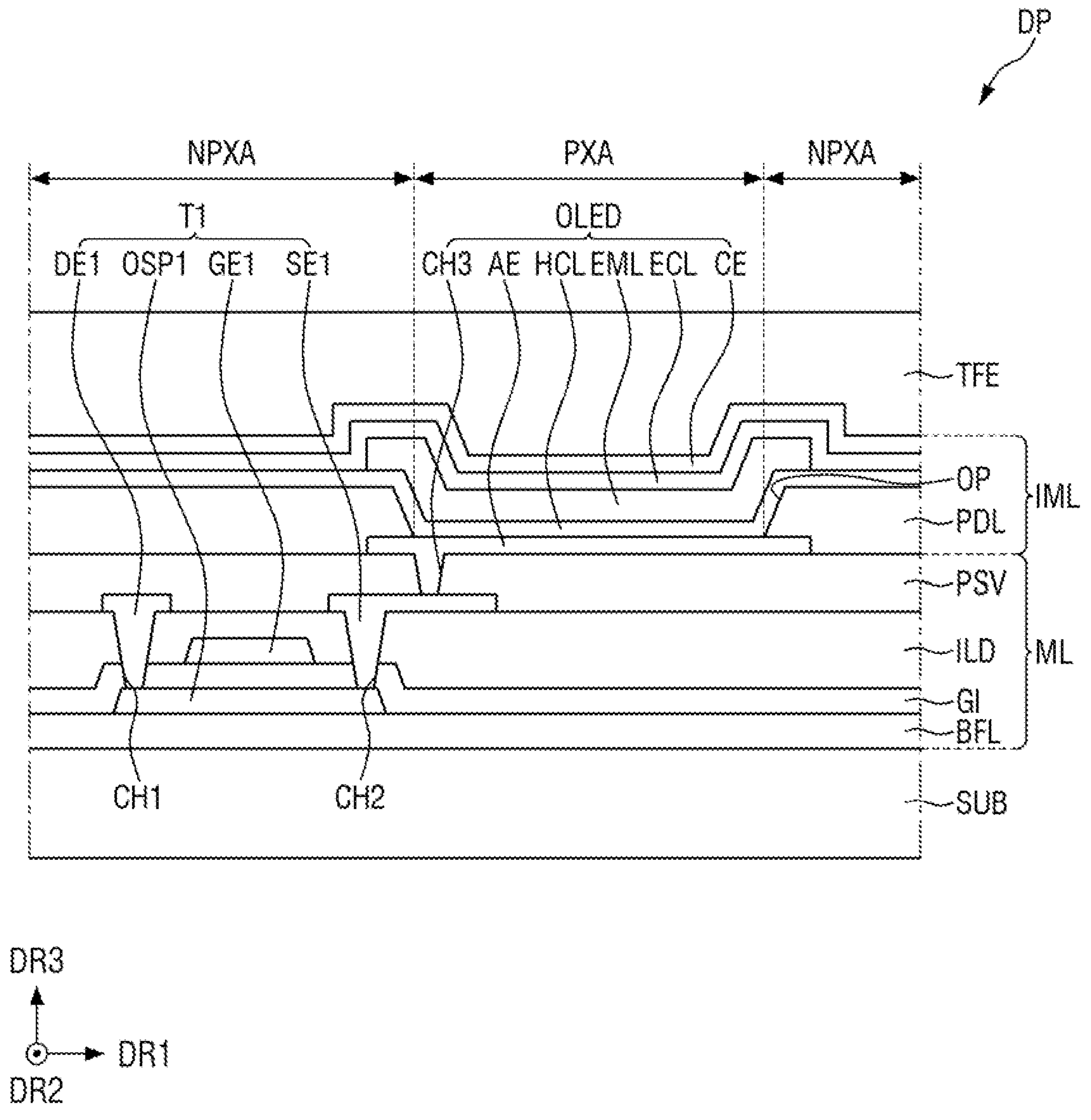
FIG. 24 is a cross-sectional view of a display panel according to an embodiment.

FIG. 24 is a cross-sectional view of a display panel DP according to an embodiment.

Referring to FIG. 24, the display panel DP may include a base layer SUB, a circuit element layer ML, a display element layer IML, and a thin-film encapsulation layer TFE. The circuit element layer ML, the display element layer IML, and the thin-film encapsulation layer TFE may be sequentially disposed on the base layer SUB. For example, the circuit element layer ML may be disposed on the base layer SUB, the display element layer IML may be disposed on the circuit element layer ML, and the thin-film encapsulation layer TFE may be disposed on the display element layer IML.

The base layer SUB may include, for example, a synthetic resin film. A synthetic resin layer may be formed on a work substrate used in manufacturing the display panel DP. A conductive layer and an insulating layer may be formed on the synthetic resin layer. When the working substrate is removed, the synthetic resin layer may correspond to the base layer SUB. The synthetic resin layer may include a thermosetting resin. In particular, the synthetic resin layer may be a polyimide-based resin layer, and its material is not particularly limited. In addition, the base layer SUB may include an organic/inorganic composite material substrate.

In an embodiment, the circuit element layer ML may include a buffer layer BFL, a first intermediate inorganic layer GI, a second intermediate inorganic layer ILD, and an intermediate organic layer PSV. The buffer layer BFL may be an inorganic layer. The intermediate organic layer PSV may be an organic layer. Materials of the inorganic layers and the organic layer are not particularly limited. In an embodiment, the buffer layer BFL may be optionally disposed/omitted.

A semiconductor pattern OSP1 of a transistor T1 may be disposed on the buffer layer BFL. The semiconductor pattern OSP1 may be selected from amorphous silicon, polysilicon, or metal oxide semiconductor.

The first intermediate inorganic layer GI may be disposed on the semiconductor pattern OSP1. A control electrode GE1 of the transistor T1 may be disposed on the first intermediate inorganic layer GI.

The second intermediate inorganic layer ILD covering the control electrode GE1 may be disposed on the first intermediate inorganic layer GI. An input electrode DE1 and an output electrode SE1 of the transistor T1 may be disposed on the second intermediate inorganic layer ILD.

The input electrode DE1 and the output electrode SE1 may be respectively connected to the semiconductor pattern OSP1 through a first through hole CH1 and a second through hole CH2 penetrating the first intermediate inorganic layer GI and the second intermediate inorganic layer ILD. In an embodiment, the transistor T1 may be modified to have a bottom gate structure.

The intermediate organic layer PSV covering the input electrode DE1 and the output electrode SE1 may be disposed on the second intermediate inorganic layer ILD. The intermediate organic layer PSV may provide a flat surface.

The display element layer IML may be disposed on the intermediate organic layer PSV. The display element layer IML may include a pixel defining layer PDL and an organic light emitting diode OLED. The pixel defining layer PDL may include an organic material. A first electrode AE may be disposed on the intermediate organic layer PSV. The first electrode AE may be connected to the output electrode SE1 through a third through hole CH3 penetrating the intermediate organic layer PSV. An opening OP may be defined in the pixel defining layer PDL. The opening OP may expose at least a portion of the first electrode AE. In an embodiment, the pixel defining layer PDL may be omitted.

A hole control layer HCL may be disposed in an emission area PXA and a non-emission area NPXA. A light emitting layer EML may be disposed on the hole control layer HCL. The light emitting layer EML may be disposed in an area corresponding to the opening OP. The light emitting layer EML may include an organic material and/or an inorganic material. The light emitting layer EML may generate light of a predetermined color.

An electronic control layer ECL may be disposed on the light emitting layer EML. A second electrode CE may be disposed on the electronic control layer ECL.

The thin-film encapsulation layer TFE may be disposed on the second electrode CE. The thin-film encapsulation layer TFE may cover the second electrode CE. A capping layer (not illustrated) covering the second electrode CE may be further disposed between the thin-film encapsulation layer TFE and the second electrode CE. Here, the thin-film encapsulation layer TFE may directly cover the capping layer (not illustrated).

The display device DD according to an embodiment may include the window member WM manufactured using the printing apparatus 1 according to some embodiments and a method S1 of manufacturing the window member according to some embodiments. Accordingly, it may be possible to provide the display device DD with improved adhesion between the window member WM and the case member CA.

In concluding the detailed description, those skilled in the art will appreciate that many variations and modifications can be made to embodiments described herein without substantially departing from the principles of the invention. Therefore, embodiments of the invention are used in a generic and descriptive sense only and not for purposes of limitation.

What is claimed is:

1. A printing apparatus comprising:
- an outer jig comprising an outer wall portion and a recessed portion;
- an inner jig disposed in the recessed portion and forming a hole between the outer wall portion and the inner jig; and
- a print head comprising a pad portion configured to overlap the hole, wherein
- the outer jig comprises an outer coupling portion disposed adjacent to a first surface of the outer jig facing the inner jig,
- the inner jig comprises an inner coupling portion disposed adjacent to a second surface of the inner jig facing the outer jig,
- the outer jig and the inner jig are detachable from each other by detachment of the outer coupling portion and the inner coupling portion from each other,
- the outer coupling portion is located inside the outer jig,
- the inner coupling portion is located inside the inner jig, and
- the outer coupling portion and the inner coupling portion are spaced apart from each other in a state where the outer jig and the inner jig are coupled to each other.

2. The printing apparatus of claim 1, wherein a size of the recessed portion is larger than a size of the inner jig in plan view.

3. The printing apparatus of claim 1, wherein the outer coupling portion and the inner coupling portion respectively comprise magnets having different polarities.

4. The printing apparatus of claim 1, wherein at least one of the outer coupling portion or the inner coupling portion comprises a magnet.

5. The printing apparatus of claim 4, wherein the magnet is a ferromagnetic material.

6. The printing apparatus of claim 1, wherein the pad portion is formed in a rectangular parallelepiped shape in plan view configured to be inserted into the hole to print ink on a plurality of surfaces of an object disposed on the inner jig.

7. The printing apparatus of claim 1, wherein the pad portion is formed of an elastic material having a shape corresponding to the hole in plan view and that is deformable to contact a plurality of surfaces of an object disposed on the inner jig.

8. The printing apparatus of claim 1,
wherein the inner jig comprises:
a support portion comprising a flat surface; and
a plurality of side portions and a plurality of corner portions, surrounding the support portion and disposed adjacent to the support portion, and
wherein upper surfaces of the plurality of side portions and the plurality of corner portions are curved surfaces.

9. The printing apparatus of claim 8, wherein the pad portion has a same shape as a shape formed by the plurality of side portions and the plurality of corner portions in plan view.

10. The printing apparatus of claim 1, wherein
the print head further comprises a head body, wherein the pad portion is disposed on the print head, and
the pad portion comprises an opening exposing the head body.

11. A method of manufacturing a window member using a printing apparatus, the method comprising:
coupling an inner jig to an outer jig forming a hole between the outer jig and the inner jig;
placing the window member on the inner jig coupled to the outer jig;
aligning a pad portion with the hole, wherein an ink is applied to the pad portion; and
printing the ink on the window member by moving the pad portion.

12. The method of claim 11, wherein the ink comprises a light blocking material and the method further comprises hardening the ink on the window member to form a light blocking portion.

13. The method of claim 11, further comprising preparing the window member and the inner jig compatible with the window member, wherein
the inner jig comprises a support portion comprising a flat surface, and a plurality of side portions and a plurality of corner portions surrounding the support portion and disposed adjacent to the support portion,
the window member comprises a flat portion, a bending portion surrounding the flat portion and located on a side of the flat portion, and an outer side surface surrounding the bending portion and located on a side of the bending portion, and
in the placing of the window member on the inner jig, an outer periphery of the flat portion of the window member is disposed inside an outer periphery of the support portion of the inner jig.

14. The method of claim 13, wherein an area of the flat portion of the window member is smaller than an area of the support portion of the inner jig.

15. The method of claim 13, wherein in the aligning of the pad portion with the hole, the pad portion overlaps at least a portion of the flat portion of the window member.

16. A printing apparatus comprising:
an outer jig comprising a recessed portion and an outer coupling portion disposed adjacent to a first surface of the outer jig;
an inner jig detachably coupled to the outer jig and comprising an inner coupling portion disposed adjacent to a second surface of the inner jig facing the outer jig and having a curved shape at side portions thereof, and
a print head comprising a pad portion, the pad portion comprising a portion overlapping the side portions of the inner jig, wherein
the outer coupling portion is located inside the outer jig,
the inner coupling portion is located inside the inner jig, and
the outer coupling portion and the inner coupling portion are spaced apart from each other in a state where the outer jig and the inner jig are coupled to each other.

* * * * *